(12) United States Patent
Nagamura

(10) Patent No.: US 12,388,898 B2
(45) Date of Patent: Aug. 12, 2025

(54) VEHICLE-MOUNTED COMMUNICATION SYSTEM, SWITCH DEVICE, FUNCTIONAL UNIT, COMMUNICATION CONTROL METHOD, AND COMMUNICATION CONTROL PROGRAM

(71) Applicant: SUMITOMO ELECTRIC INDUSTRIES, LTD., Osaka (JP)

(72) Inventor: Yoshihisa Nagamura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 102 days.

(21) Appl. No.: 17/605,084

(22) PCT Filed: May 28, 2020

(86) PCT No.: PCT/JP2020/021029
§ 371 (c)(1),
(2) Date: Oct. 20, 2021

(87) PCT Pub. No.: WO2020/255661
PCT Pub. Date: Dec. 24, 2020

(65) Prior Publication Data
US 2022/0201081 A1    Jun. 23, 2022

(30) Foreign Application Priority Data
Jun. 20, 2019   (JP) .................. 2019-114700

(51) Int. Cl.
*H04L 67/12* (2022.01)
*G06V 10/94* (2022.01)

(52) U.S. Cl.
CPC .......... *H04L 67/12* (2013.01); *G06F 2218/02* (2023.01); *G06V 10/95* (2022.01)

(58) Field of Classification Search
CPC ..... H04L 67/12; G06F 2218/02; G06F 30/15; G06F 18/251; G06V 20/58
See application file for complete search history.

(56) References Cited

U.S. PATENT DOCUMENTS 11,454,976 B1 *   9/2022  Levinson ............. G05D 1/0251
11,511,627 B2 *  11/2022  Watanabe ................ H04N 7/18
(Continued)

FOREIGN PATENT DOCUMENTS

| CN | 101300144 A | 11/2008 |
| JP | 2010-152873 A | 7/2010 |

(Continued)

*Primary Examiner* — Schquita D Goodwin
*Assistant Examiner* — Linh T. Nguyen
(74) *Attorney, Agent, or Firm* — Oliff PLC

(57) ABSTRACT

A vehicle-mounted communication system includes multiple switch devices that are mounted on a vehicle. At least one of the multiple switch devices is capable of performing intermediate processing that is intermediate information processing on measurement information from a sensor that is mounted on the vehicle. The at least one of the multiple switch devices transmits at least information that is generated by the intermediate processing or the measurement information as relay information to another switch device. The other switch device transmits the relay information that is transmitted to a functional unit that is to perform a target process by using the relay information.

15 Claims, 9 Drawing Sheets

(56) References Cited

U.S. PATENT DOCUMENTS

| | | | |
|---|---|---|---|
| 11,577,741 B1* | 2/2023 | Reschka | B60W 50/045 |
| 2007/0154068 A1* | 7/2007 | Stein | G01B 11/026 |
| | | | 348/148 |
| 2009/0144233 A1* | 6/2009 | Grigsby | G06F 16/29 |
| | | | 707/E17.02 |
| 2009/0160629 A1 | 6/2009 | Shimura | |
| 2009/0265079 A1* | 10/2009 | Kondo | F02D 41/221 |
| | | | 701/103 |
| 2011/0010046 A1 | 1/2011 | Harada et al. | |
| 2011/0228985 A1 | 9/2011 | Uchida et al. | |
| 2011/0312293 A1* | 12/2011 | Takayama | H03H 17/0294 |
| | | | 455/296 |
| 2013/0096921 A1* | 4/2013 | Kuwamoto | G08G 1/0962 |
| | | | 704/260 |
| 2016/0325680 A1* | 11/2016 | Curtis | H04W 4/024 |
| 2016/0328839 A1* | 11/2016 | Aoki | H04N 23/00 |
| 2017/0084172 A1* | 3/2017 | Rolle | G08G 1/0129 |
| 2017/0116461 A1* | 4/2017 | Kakita | G06V 10/762 |
| 2018/0136642 A1* | 5/2018 | Tian | G05D 1/0016 |
| 2018/0143633 A1* | 5/2018 | Paryani | B60W 10/12 |
| 2018/0232639 A1* | 8/2018 | Lin | G06N 3/063 |
| 2018/0237006 A1* | 8/2018 | Ishii | B60W 30/08 |
| 2018/0272963 A1* | 9/2018 | Meyhofer | B60W 50/023 |
| 2018/0341827 A1* | 11/2018 | Niikura | H04N 23/60 |
| 2019/0045092 A1* | 2/2019 | Kitani | H04N 23/63 |
| 2019/0094882 A1* | 3/2019 | Kim | B60W 10/20 |
| 2019/0202451 A1* | 7/2019 | Hayamizu | B60W 10/18 |
| 2019/0265714 A1* | 8/2019 | Ball | G06N 3/08 |
| 2020/0198634 A1* | 6/2020 | Yashiro | G08G 1/16 |
| 2020/0250399 A1* | 8/2020 | Matsumaru | G06V 20/58 |
| 2020/0307569 A1* | 10/2020 | Yasui | B60W 30/0956 |
| 2020/0334554 A1* | 10/2020 | Takahashi | G06F 11/3065 |
| 2020/0387705 A1* | 12/2020 | Lee | H04W 4/38 |
| 2021/0004611 A1* | 1/2021 | Garimella | C04B 35/64 |
| | | | 264/603 |
| 2021/0343034 A1* | 11/2021 | Harmsen | G06T 7/292 |

FOREIGN PATENT DOCUMENTS

| | | |
|---|---|---|
| JP | 2011-18283 A | 1/2011 |
| JP | 2016-127569 A | 7/2016 |
| JP | 2017-107409 A | 6/2017 |
| JP | 2018-197925 A | 12/2018 |
| WO | 2019/009280 A1 | 1/2019 |

* cited by examiner

VEHICLE-MOUNTED COMMUNICATION SYSTEM, SWITCH DEVICE, FUNCTIONAL UNIT, COMMUNICATION CONTROL METHOD, AND COMMUNICATION CONTROL PROGRAM

TECHNICAL FIELD

The present disclosure relates to a vehicle-mounted communication system, a switch device, a functional unit, a communication control method, and a communication control program.

This application claims benefit of Japanese Patent Application No. 2019-114700 filed on Jun. 20, 2019, the entire contents of which are incorporated herein by reference.

BACKGROUND ART

In PTL 1 (Japanese Unexamined Patent Application Publication No. 2010-152873), an approaching object detection system described below is disclosed. That is, the approaching object detection system includes a camera that is fixed at a predetermined position to capture an image, a first moving region detection unit that detects, based on a plurality of continuous images captured in time series by the camera, image portions of the images moved in a certain direction in time series by optical flow processing, a second moving region detection unit that processes, based on dynamic programming, an image portion of each of the images detected by the first moving region detection unit to determine a change in size of the image portion in a direction different from the certain direction, and an approaching object determining unit that determines whether a moving object corresponding to the image portion is an object approaching the camera according to the change.

In PTL 2 (Japanese Unexamined Patent Application Publication No. 2011-18283), an object detection device described below is disclosed. That is, the object detection device is mounted in a vehicle, detects an object in the vicinity of the host-vehicle, and includes a host-vehicle state prediction unit that acquires a target state of the host-vehicle, a detection unit that detects the object, and a detection characteristic control unit that switches the detection characteristic of the object in the detection unit in accordance with the target state.

CITATION LIST

Patent Literature

PTL 1: Japanese Unexamined Patent Application Publication No. 2010-152873
PTL 2: Japanese Unexamined Patent Application Publication No. 2011-18283

SUMMARY OF INVENTION

A vehicle-mounted communication system according to the present disclosure includes multiple switch devices that are mounted on a vehicle. At least one of the multiple switch devices is capable of performing intermediate processing that is intermediate information processing on measurement information from a sensor that is mounted on the vehicle. The at least one of the multiple switch devices transmits at least information that is generated by the intermediate processing or the measurement information as relay information to another switch device. The other switch device transmits the relay information that is transmitted to a functional unit that is to perform a target process by using the relay information.

A switch device according to the present disclosure is a switch device that is mounted on a vehicle. The switch device includes a processing unit that is capable of performing intermediate processing that is intermediate information processing on measurement information from a sensor that is mounted on the vehicle, and a relay unit that transmits at least information that is generated by the intermediate processing or the measurement information as relay information to another device.

A functional unit according to the present disclosure is a functional unit that is mounted on a vehicle on which multiple switch devices are mounted. The functional unit includes a receiving unit that receives, from the multiple switch devices, relay information based on measurement information from a sensor that is mounted on the vehicle, a processing unit that performs a target process by using the relay information that is received by the receiving unit, and an indication unit that transmits instruction information that represents an instruction about intermediate processing to the multiple switch devices that are capable of performing the intermediate processing that is intermediate information processing on the measurement information.

A communication control method according to the present disclosure is a communication control method for a vehicle-mounted communication system that includes multiple switch devices that are mounted on a vehicle. The communication control method includes a step at which at least one of the multiple switch devices performs intermediate processing that is intermediate information processing on measurement information from a sensor that is mounted on the vehicle, a step at which the at least one of the multiple switch devices transmits at least information that is generated by the intermediate processing or the measurement information as relay information to another switch device, and a step at which the other switch device transmits the relay information that is transmitted to a functional unit that is to perform a target process by using the relay information.

A communication control method according to the present disclosure is a communication control method for a switch device that is mounted on a vehicle. The communication control method includes a step of performing intermediate processing that is intermediate information processing on measurement information from a sensor that is mounted on the vehicle, and a step of transmitting at least information that is generated by the intermediate processing or the measurement information as relay information to another device.

A communication control method according to the present disclosure is a communication control method for a functional unit that is mounted on a vehicle. The communication control method includes a step of receiving relay information from a switch device that is mounted on the vehicle, a step of performing a target process by using the received relay information, and a step of transmitting instruction information that represents an instruction about intermediate processing to a switch device that is capable of performing the intermediate processing that is intermediate information processing on measurement information from a sensor that is mounted on the vehicle.

A communication control program according to the present disclosure is a communication control program that is used by a switch device that is mounted on a vehicle. The communication control program causes a computer to function as a processing unit that is capable of performing intermediate processing that is intermediate information processing on measurement information from a sensor that is mounted on the vehicle, and a relay unit that transmits at least information that is generated by the intermediate processing or the measurement information as relay information to another device.

A communication control program according to the present disclosure is a communication control program that is used by a functional unit that is mounted on a vehicle. The communication control program causes a computer to function as a receiving unit that receives relay information from a switch device that is mounted on the vehicle, a processing unit that performs a target process by using the relay information that is received by the receiving unit, and an indication unit that transmits instruction information that represents an instruction about intermediate processing to a switch device that is capable of performing the intermediate processing that is intermediate information processing on measurement information from a sensor that is mounted on the vehicle.

An aspect of the present disclosure can be achieved as a semiconductor integrated circuit that serves as a part or the whole of a vehicle-mounted communication system. An aspect of the present disclosure can be achieved as a semiconductor integrated circuit that serves as a part or the whole of a switch device. An aspect of the present disclosure can be achieved as a semiconductor integrated circuit that serves as a part or the whole of a functional unit. An aspect of the present disclosure can be achieved as a program that causes a computer to perform a step of processing of a vehicle-mounted communication system.

DESCRIPTION OF EMBODIMENTS

Figure 1:
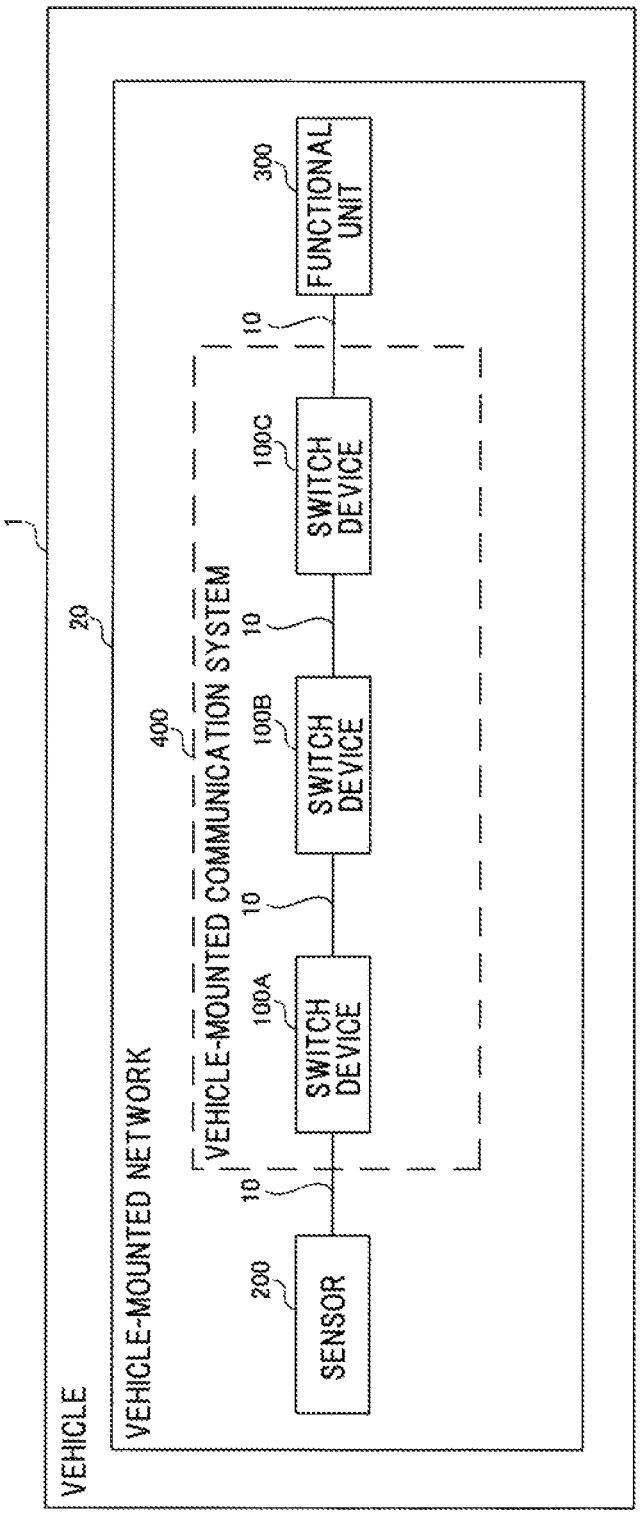
FIG. 1 illustrates the structure of a vehicle-mounted communication system according to an embodiment of the present disclosure.

A technique for detecting an object around a vehicle, based on the result of measurement by using a sensor that is mounted on the vehicle, has been developed.

Problems to be Solved by Present Disclosure

There is a need for a technique that enables the processing load of a vehicle-mounted network to be decreased beyond the techniques disclosed in PTL 1 and PTL 2.

The present disclosure has been accomplished to solve the problem described above, and it is an object of the present disclosure to provide a vehicle-mounted communication system, a switch device, a functional unit, a communication control method, and a communication control program that enable the processing load of the vehicle-mounted network to be decreased.

Advantageous Effects of Present Disclosure

According to the present disclosure, the processing load of the vehicle-mounted network can be decreased.

DESCRIPTION OF EMBODIMENT OF PRESENT DISCLOSURE

The content of an embodiment of the present disclosure will be first listed and described.

(1) A vehicle-mounted communication system according to the embodiment of the present disclosure includes multiple switch devices that are mounted on a vehicle. At least one of the multiple switch devices is capable of performing intermediate processing that is intermediate information processing on measurement information from a sensor that is mounted on the vehicle. The at least one of the multiple switch devices transmits at least information that is generated by the intermediate processing or the measurement information as relay information to another switch device. The other switch device transmits the relay information that is transmitted to a functional unit that is to perform a target process by using the relay information.

The at least one of the multiple switch devices thus transmits at least the information that is generated by the intermediate processing on the measurement information or the measurement information as the relay information to the other switch device. For example, this enables the at least one of the multiple switch devices to perform a part of the target process to be performed by the functional unit and consequently enables the processing load of the functional unit to be shared with the at least one of the multiple switch devices. This inhibits the processing load of the functional unit from concentrating and reduces, for example, heat generation due to the processing load. Accordingly, the processing load of a vehicle-mounted network can be decreased.

(2) The at least one of the multiple switch devices preferably analyzes the measurement information that is received and performs the intermediate processing, based on a result of analysis.

With this structure, the at least one of the multiple switch devices is capable of transmitting, to the functional unit, useful information that can be used in the target process of the functional unit as the relay information in accordance with the content of the measurement information.

(3) The at least one of the multiple switch devices preferably performs the intermediate processing in accordance with instruction information from the functional unit.

With this structure, information that is needed by the functional unit can be transmitted as the relay information to the functional unit, based on the instruction information from the functional unit.

(4) The at least one of the multiple switch devices is preferably capable of at least changing a content of the intermediate processing or changing whether the relay information is transmitted.

With this structure, the content of the information processing of the at least one of the multiple switch devices can be changed, for example, depending on the situation of travelling of the vehicle or the situation of the processing load of the functional unit.

(5) The at least one of the multiple switch devices is more preferably capable of changing the content of the intermediate processing by switching between a mode in which new information is generated from the measurement information and a mode in which new information is not generated.

With this structure, for example, the intermediate processing enables new useful information that can be used in the target process of the functional unit to be generated and transmitted to the functional unit.

(6) The at least one of the multiple switch devices preferably performs the intermediate processing by analyzing the measurement information that is received and transmits the relay information that is acquired by adding a result of analysis into the measurement information to the other switch device.

With this structure, the relay information that includes the result of analysis can be transmitted to the functional unit, and a part or the whole of analysis processing that is to be performed by the functional unit can be delegated to the at least one of the multiple switch devices.

(7) The at least one of the multiple switch devices preferably performs the intermediate processing by analyzing the measurement information that is received and transmits a result of analysis as the relay information to the other switch device.

With this structure, the result of analysis can be transmitted as the relay information to the functional unit, the amount of the data of the relay information that is transmitted to the functional unit is decreased, and a part or the whole of the analysis processing that is to be performed by the functional unit can be delegated to the at least one of the multiple switch devices.

(8) A switch device according to the embodiment of the present disclosure is a switch device that is mounted on a vehicle. The switch device includes a processing unit that is capable of performing intermediate processing that is intermediate information processing on measurement information from a sensor that is mounted on the vehicle, and a relay unit that transmits at least information that is generated by the intermediate processing or the measurement information as relay information to another device.

At least the information that is generated by the intermediate processing on the measurement information or the measurement information is thus transmitted as the relay information to the other device. Consequently, the vehicle-mounted network that includes the switch device and the functional unit that is to perform the target process by using a relay process enables the switch device to perform, for example, a part of the target process that is to be performed by the functional unit and consequently enables the processing load of the functional unit to be shared with the switch device. This inhibits the processing load of the functional unit from concentrating and reduces, for example, heat generation due to the processing load. Accordingly, the processing load of the vehicle-mounted network can be decreased.

(9) A functional unit according to the embodiment of the present disclosure is a functional unit that is mounted on a vehicle on which multiple switch devices are mounted. The functional unit includes a receiving unit that receives, from the multiple switch devices, relay information based on measurement information from a sensor that is mounted on the vehicle, a processing unit that performs a target process by using the relay information that is received by the receiving unit, and an indication unit that transmits instruction information that represents an instruction about intermediate processing to the multiple switch devices that are capable of performing the intermediate processing that is intermediate information processing on the measurement information.

The instruction information that represents the instruction about the intermediate processing is thus transmitted to the multiple switch devices that are capable of performing the intermediate processing on the measurement information. Consequently, a part of the target process to be performed by itself, for example, can be performed as the intermediate processing by the multiple switch devices, and consequently, its own processing load can be shared with the multiple switch devices. This inhibits the processing load from concentrating and reduces, for example, heat generation due to the processing load. Accordingly, the processing load of the vehicle-mounted network can be decreased.

(10) The processing unit preferably analyzes the relay information in the target process, and the indication unit preferably generates the instruction information, based on a result of analysis with the processing unit.

With this structure, the content of the relay information that is transmitted by the multiple switch devices can be instructed to the multiple switch devices depending on, for example, the situation of travelling of the vehicle that is detected by analyzing the relay information.

(11) A communication control method according to the embodiment of the present disclosure is a communication control method for a vehicle-mounted communication system that includes multiple switch devices that are mounted on a vehicle. The communication control method includes a step at which at least one of the multiple switch devices performs intermediate processing that is intermediate information processing on measurement information from a sensor that is mounted on the vehicle, a step at which the at least one of the multiple switch devices transmits at least information that is generated by the intermediate processing or the measurement information as relay information to another switch device, and a step at which the other switch device transmits the relay information that is transmitted to a functional unit that is to perform a target process by using the relay information.

A part of the target process to be performed by the functional unit, for example, can be performed by the at least one of the multiple switch devices, and consequently, the processing load of the functional unit can be shared with the at least one of the multiple switch devices in a manner in which the at least one of the multiple switch devices thus transmits at least the information that is generated by the intermediate processing on the measurement information or the measurement information as the relay information to the other switch device. This inhibits the processing load of the functional unit from concentrating and reduces, for example, heat generation due to the processing load. Accordingly, the processing load of the vehicle-mounted network can be decreased.

(12) A communication control method according to the embodiment of the present disclosure is a communication control method for a switch device that is mounted on a vehicle. The communication control method includes a step of performing intermediate processing that is intermediate information processing on measurement information from a sensor that is mounted on the vehicle, and a step of transmitting at least information that is generated by the intermediate processing or the measurement information as relay information to another device.

The vehicle-mounted network that includes the switch device and the functional unit that is to perform the target process by using the relay process enables the switch device to perform, for example, a part of the target process that is to be performed by the functional unit and consequently enables the processing load of the functional unit to be shared with the switch device in a manner in which at least the information that is generated by the intermediate processing on the measurement information or the measurement information is transmitted as the relay information to the other device. This inhibits the processing load of the functional unit from concentrating and reduces, for example, heat generation due to the processing load. Accordingly, the processing load of the vehicle-mounted network can be decreased.

(13) A communication control method according to the embodiment of the present disclosure is a communication control method for a functional unit that is mounted on a vehicle. The communication control method includes a step of receiving relay information from a switch device that is mounted on the vehicle, a step of performing a target process by using the received relay information, and a step of transmitting instruction information that represents an instruction about intermediate processing to a switch device that is capable of performing the intermediate processing that is intermediate information processing on measurement information from a sensor that is mounted on the vehicle.

A part of the target process to be performed by itself, for example, can be performed as the intermediate processing by the switch device, and consequently, its own processing load can be shared with the switch device in a manner in which the instruction information that represents the instruction about the intermediate processing is transmitted to the switch device that is capable of performing the intermediate processing on the measurement information. This inhibits the processing load from concentrating and reduces, for example, heat generation due to the processing load. Accordingly, the processing load of the vehicle-mounted network can be decreased.

(14) A communication control program according to the embodiment of the present disclosure is a communication control program that is used by a switch device that is mounted on a vehicle. The communication control program causes a computer to function as a processing unit that is capable of performing intermediate processing that is intermediate information processing on measurement information from a sensor that is mounted on the vehicle, and a relay unit that transmits at least information that is generated by the intermediate processing or the measurement information as relay information to another device.

At least the information that is generated by the intermediate processing on the measurement information or the measurement information is thus transmitted as the relay information to the other device. Consequently, the vehicle-mounted network that includes the switch device and the functional unit that is to perform the target process by using the relay process enables the switch device to perform, for example, a part of the target process that is to be performed by the functional unit and consequently enables the processing load of the functional unit to be shared with the switch device. This inhibits the processing load of the functional unit from concentrating and reduces, for example, heat generation due to the processing load. Accordingly, the processing load of the vehicle-mounted network can be decreased.

(15) A communication control program according to the embodiment of the present disclosure is a communication control program that is used by a functional unit that is mounted on a vehicle. The communication control program causes a computer to function as a receiving unit that receives relay information from a switch device that is mounted on the vehicle, a processing unit that performs a target process by using the relay information that is received by the receiving unit, and an indication unit that transmits instruction information that represents an instruction about intermediate processing to a switch device that is capable of performing the intermediate processing that is intermediate information processing on measurement information from a sensor that is mounted on the vehicle.

The instruction information that represents the instruction about the intermediate processing is thus transmitted to the switch device that is capable of performing the intermediate processing on the measurement information. Consequently, a part of the target process to be performed by itself, for example, can be performed as the intermediate processing by the switch device, and consequently, its own processing load can be shared with the switch device. This inhibits the processing load from concentrating and reduces, for example, heat generation due to the processing load. Accordingly, the processing load of the vehicle-mounted network can be decreased.

The embodiment of the present disclosure will now be described with reference to the drawings. In the drawings, portions like or corresponding to each other are designated by like reference signs, and a description thereof is not repeated. At least parts of the embodiment described below may be freely combined.

[Vehicle-Mounted Communication System]

FIG. 1 illustrates the structure of a vehicle-mounted communication system according to the embodiment of the present disclosure.

Referring to FIG. 1, a vehicle-mounted communication system 400 includes multiple switch devices 100 that are mounted on a vehicle 1. In an example illustrated in FIG. 1, the vehicle-mounted communication system 400 includes three switch devices 100A, 100B, and 100C as the switch devices 100. The vehicle-mounted communication system 400 is not limited by a structure that includes the three switch devices 100 but may have a structure that includes two switch devices 100 or four or more switch devices 100.

For example, the switch devices 100 are connected to each other in series with ethernet (registered trademark) cables 10 interposed therebetween. Specifically, the switch device 100A, the switch device 100B, and the switch device 100C are connected in this order with the ethernet cables 10 interposed therebetween.

The switch device 100A is connected to a sensor 200 with the ethernet cable 10 interposed therebetween. The switch device 100A may be connected to multiple sensors 200.

The switch device 100C is connected to a functional unit 300 with the ethernet cable 10 interposed therebetween.

The switch devices 100, the sensor 200, and the functional unit 300 form a vehicle-mounted network 20.

The switch devices 100 can relay information that is exchanged on the vehicle-mounted network 20.

Examples of the sensor 200 include various sensors such as a camera, a LiDAR (Light Detection and Ranging), a millimeter-wave radar, and a speed sensor.

The sensor 200 makes measurement, for example, periodically and generates an IP packet that contains measurement information that represents the result of measurement and the IP address of the functional unit 300 that is set as a destination IP address. The sensor 200 transmits an ethernet frame that contains the generated IP packet to the switch device 100A.

The switch devices 100 relay the ethernet frame that is transmitted from the sensor 200 to the functional unit 300.

More specifically, the switch device 100A receives the ethernet frame from the sensor 200, then acquires the destination IP address from the IP packet that is contained in the received ethernet frame, and transmits the ethernet frame to the switch device 100B, based on the acquired destination IP address.

The switch device 100B receives the ethernet frame from the switch device 100A, then acquires the destination IP address from the IP packet that is contained in the received ethernet frame, and transmits the ethernet frame to the switch device 100C, based on the acquired destination IP address.

The switch device 100C receives the ethernet frame from the switch device 100B, then acquires the destination IP address from the IP packet that is contained in the received ethernet frame, and transmits the ethernet frame to the functional unit 300, based on the acquired destination IP address.

The functional unit 300 receives the ethernet frame from the sensor 200 via the three switch devices 100, then acquires the measurement information from the received ethernet frame, and performs a process by using the acquired measurement information, that is, a target process.

For example, the functional unit 300 is an autonomous driving ECU (Electronic Control Unit). The autonomous driving ECU receives the measurement information from the sensor via the switch devices 100 and then performs the target process by using the received measurement information, for example, in a manner in which the situation of travelling of the vehicle 1 is detected, and automatic driving control based on the result of detection is implemented.

The vehicle-mounted network 20 is not limited by a configuration by which the ethernet frame is relayed in accordance with an ethernet communication standard but may be configured such that the measurement information, for example, is transmitted in accordance with a communication standard such as CAN (Controller Area Network) (registered trademark), FlexRay (registered trademark), MOST (Media Oriented Systems Transport) (registered trademark), and a LIN (Local Interconnect Network).

At least one of the switch devices 100 is capable of performing the intermediate processing that is intermediate information processing on the measurement information from the sensor 200.

In an example illustrated in FIG. 1, the switch device 100A of the three switch devices 100 is capable of performing the intermediate processing.

[First Example of Intermediate Processing]

An example of the intermediate processing of the switch device 100A is to discard the measurement information that is received from the sensor 200 without transmitting the measurement information to the switch device 100B.

[Second Example of Intermediate Processing]

Another example of the intermediate processing of the switch device 100A is to process the measurement information that is received from the sensor 200.

For example, the switch device 100A analyzes the received measurement information, generates the relay information that is acquired by adding the result of analysis into the measurement information, and transmits the generated relay information to the switch device 100B. Specifically, the switch device 100A generates the relay information that is acquired by adding information that is acquired by analyzing the measurement information into the measurement information and transmits the generated relay information to the switch device 100B.

Alternatively, the switch device 100A analyzes the received measurement information and transmits the result of analysis as the relay information to the switch device 100B. Specifically, the switch device 100A transmits the information that is acquired by analyzing the measurement information as the relay information to the switch device 100B.

For example, the switch device 100A performs the intermediate processing described above, based on the result of analysis of the measurement information that is received from the sensor 200.

[Change]

For example, the switch device 100A is capable of at least changing the content of the intermediate processing or changing whether the relay information is transmitted. More specifically, the switch device 100A changes the content of the intermediate processing and changes whether the relay information is transmitted, based on the result of analysis of the measurement information.

The switch device 100A is capable of changing the content of the intermediate processing, for example, by switching between a mode in which new information is generated from the measurement information and a mode in which new information is not generated.

Specifically, the switch device 100A changes the content of the intermediate processing by switching between generation of the relay information that is acquired by processing the measurement information and that does not include new information and generation of the relay information that includes the new information in a manner in which the measurement information that is received from the sensor 200 is subjected to the intermediate processing, for example, is processed.

The switch device 100A changes the content of the intermediate processing, for example, by changing the content of new information that is generated from the measurement information by performing the intermediate processing.

The switch device 100A is capable of changing whether the relay information is transmitted, for example, by switching transmission of the measurement information that is received from the sensor 200 as the relay information to the switch device 100B and the performance of the intermediate processing of discarding the measurement information.

[Processing of Switch Devices 100B and 100C]

The switch device 100B transmits at least the information that is generated by the intermediate processing of the switch device 100A or the measurement information as the relay information to the switch device 100C.

More specifically, the switch device 100B transmits at least the relay information that is received from the switch device 100A or the measurement information as the relay information to the switch device 100C.

The switch device 100C transmits the transmitted relay information, that is, the relay information that is received from the switch device 100B to the functional unit 300.

[Processing of Functional Unit 300]

The functional unit 300 performs the target process described above by using the relay information that is received from the switch device 100C.

The functional unit 300 generates instruction information that represents an instruction about the intermediate processing in the target process and transmits the generated instruction information to the switch device 100A.

For example, the functional unit 300 generates the instruction information that represents whether the intermediate processing is needed or the content thereof and transmits the ethernet frame that contains the generated instruction information to the switch device 100A.

The functional unit 300 analyzes the relay information that is received from the switch device 100C, detects the situation of travelling of the vehicle 1, based on the result of analysis, and generates the instruction information, based on the result of detection. Alternatively, the functional unit 300 generates the instruction information depending on the situation of its own processing load.

The switch device 100A receives the instruction information from the functional unit 300 and then performs the intermediate processing described above in accordance with the received instruction information.

For example, the switch device 100A performs the intermediate processing, based on the result of analysis of the measurement information, receives the instruction information from the functional unit 300, then stops the intermediate processing based on the result of analysis, and performs the intermediate processing in accordance with the received instruction information.

Instead of the switch device 100A or in addition to the switch device 100A, at least the switch device 100B or the switch device 100C may be capable of performing the intermediate processing. For example, the switch device 100B may perform the intermediate processing on the measurement information that is transmitted from the switch device 100A and may transmit the information that is generated by the intermediate processing as the relay information to the switch device 100C.

Figure 2:
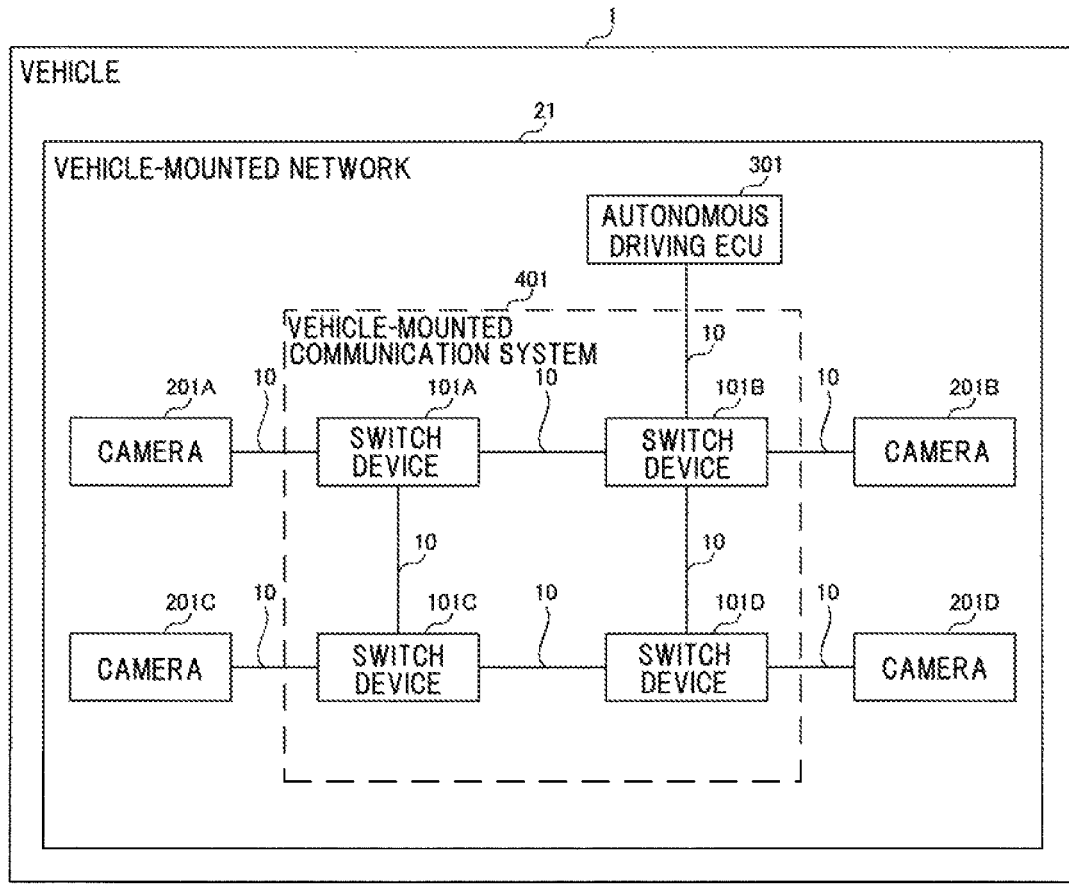
FIG. 2 illustrates a specific example of the structure of the vehicle-mounted communication system according to the embodiment of the present disclosure.

FIG. 2 illustrates a specific example of the structure of the vehicle-mounted communication system according to the embodiment of the present disclosure.

Referring to FIG. 2, a vehicle-mounted communication system 401 includes four switch devices 101A, 101B, 101C, and 101D that are mounted on the vehicle 1. The switch devices 101A, 101B, 101C, and 101D are also referred to below as the switch devices 101.

For example, the switch devices 101 form a ring topology by using the ethernet cables 10.

Specifically, the switch device 101A and the switch device 101B are connected, the switch device 101A and the switch device 101C are connected, the switch device 101B and the switch device 101D are connected, and the switch device 101C and the switch device 101D are connected, with the ethernet cables 10 interposed therebetween.

The switch devices 101 are connected to cameras 201 that are mounted on the vehicle 1 by using the ethernet cables 10. The cameras 201 are examples of the sensor.

Specifically, the switch device 101A is connected to a camera 201A, the switch device 101B is connected to a camera 201B, the switch device 101C is connected to a camera 201C, and the switch device 101D is connected to a camera 201D.

The switch device 101B is connected to an autonomous driving ECU 301 that is an example of the functional unit with the ethernet cable 10 interposed therebetween.

The switch devices 101, the cameras 201, and the autonomous driving ECU 301 form a vehicle-mounted network 21.

The switch devices 101 are capable of relaying information that is exchanged on the vehicle-mounted network 21.

For example, the cameras 201 are imaging devices that periodically photograph a target region around the vehicle 1. The cameras 201 generate image information that represents an imaged image of the target region by photographing the target region around the vehicle 1. The image information is an example of the measurement information. The cameras 201 transmit the generated image information to the autonomous driving ECU 301 via the switch devices 101 by using the ethernet frame as described above.

For example, the camera 201A generates image information A that represents an imaged image by photographing a left region in front of the vehicle 1 as the target region. The camera 201A transmits the generated image information A to the switch device 101A.

For example, the camera 201B generates image information B that represents an imaged image by photographing a right region in front of the vehicle 1 as the target region. The camera 201B transmits the generated image information B to the switch device 101B.

For example, the camera 201C generates image information C that represents an imaged image by photographing a left region behind the vehicle 1 as the target region. The camera 201C transmits the generated image information C to the switch device 101C.

For example, the camera 201D generates image information D that represents an imaged image by photographing a right region behind the vehicle 1 as the target region. The camera 201D transmits the generated image information D to the switch device 101D.

Figure 3:
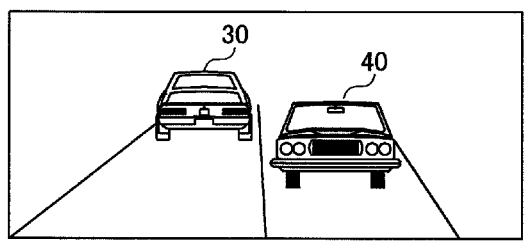
FIG. 3 illustrates an example of an imaged image that is represented by image information that is received by each of switch devices according to the embodiment of the present disclosure from cameras.

FIG. 3 illustrates an example of an imaged image that is represented by the image information that is received by each of the switch devices according to the embodiment of the present disclosure from the cameras.

Referring to FIG. 3, for example, each of the switch devices 101 receives image information that represents an imaged image that is generated by photographing the target region including the current positions of other vehicles 30 and 40 from the cameras 201.

Figure 4:
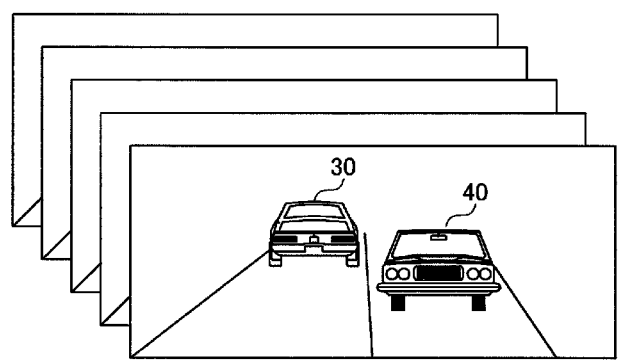
FIG. 4 illustrates another example of the imaged image that is represented by the image information that is received by each switch device according to the embodiment of the present disclosure from the cameras.

FIG. 4 illustrates another example of the imaged image that is represented by the image information that is received by each of the switch devices according to the embodiment of the present disclosure from the cameras.

Referring to FIG. 4, for example, each of the switch devices 101 receives pieces of image information that represent multiple time-series imaged images that are generated by continuously photographing the target region including the current positions of the other vehicles 30 and 40 from the respective cameras 201.

The switch devices 101 are capable of performing the intermediate processing on the image information that is received from the respective cameras 201.

For example, the switch devices 101 receive the instruction information from the autonomous driving ECU 301 and then saves the received instruction information in their own storage units. The switch devices 101 receive the image information from the cameras 201 and then perform the intermediate processing in accordance with the instruction information that is saved in their own storage units.

For example, the switch devices 101 analyze the image information that is received from the respective cameras 201 and perform the intermediate processing, based on the result of analysis.

Specifically, the switch devices 101 receive the image information from the cameras 201, then determine whether there is an object to be detected such as another vehicle or a pedestrian in the target regions of the cameras 201 by analyzing the received image information, and perform the intermediate processing, based on the result of determination.

If it is determined from the result of analysis of the image information that the object to be detected is not in the imaged image, and there is not the object to be detected in the target regions of the cameras 201, the switch devices 101 perform the intermediate processing by discarding the image information that is received from the cameras 201 without transmitting the image information to another switch device 101.

If it is determined from the result of analysis of the image information that the object to be detected is in the imaged image, and there is the object to be detected in the target regions of the cameras 201, the switch devices 101 transmit the image information that is received from the cameras 201 as the relay information to another switch device 101.

Alternatively, if it is determined from the result of analysis of the image information that the object to be detected is in the imaged image, and there is the object to be detected in the target regions of the cameras 201, the switch devices 101 perform the intermediate processing by generating new information depending on the result of analysis of the image information and by transmitting the generated information as the relay information to another switch device 101.

Referring to FIG. 2 again, the switch device 101A transmits at least information that is generated by performing the intermediate processing on the image information A that is received from the camera 201A or the image information A as relay information A to the switch device 101B on the vehicle-mounted network 20.

The switch device 101C transmits at least information that is generated by performing the intermediate processing on the image information C that is received from the camera 201C or the image information C as relay information C to the switch device 101D.

The switch device 101D transmits at least information that is generated by performing the intermediate processing on the image information D that is received from the camera 201D or the image information D as relay information D to the switch device 101B.

The switch device 101D transmits the relay information C that is received from the switch device 101C to the switch device 101B.

The switch device 101B transmits information that is generated by performing the intermediate processing on the image information B that is received from the camera 201B or the image information B as relay information B to the autonomous driving ECU 301.

The switch device 101B transmits the relay information A that is received from the switch device 101A and the relay information C and D that is received from the switch device 101D to the autonomous driving ECU 301.

For example, the autonomous driving ECU 301 detects the situation of travelling of the vehicle 1 and implements the automatic driving control based on the result of detection by using the relay information A, B, C, and D that is received from the switch device 101B.

For example, the switch devices 101 are capable of performing the intermediate processing on the image information from the cameras 201 that are connected to other switch devices 101.

Specifically, the switch device 101D is capable of performing the intermediate processing on the image information C that is received as the relay information C from the switch device 101C.

The switch device 101B is capable of performing the intermediate processing on the image information A that is received as the relay information A from the switch device 101A, is capable of performing the intermediate processing on the image information D that is received as the relay information D from the switch device 101D, and is capable of performing the intermediate processing on the image information C that is received as the relay information C from the switch device 101C.

For example, the switch devices 101 are capable of performing the intermediate processing on the relay information that is generated by the intermediate processing of other switch devices 101.

Specifically, the switch device 101D is capable of performing the intermediate processing on the relay information C that is generated by the intermediate processing of the switch device 101C.

The switch device 101B is capable of performing the intermediate processing on the relay information A that is generated by the intermediate processing of the switch device 101A and is capable of performing the intermediate processing on the relay information D that is generated by the intermediate processing of the switch device 101D.

[Switch Device]

Figure 5:
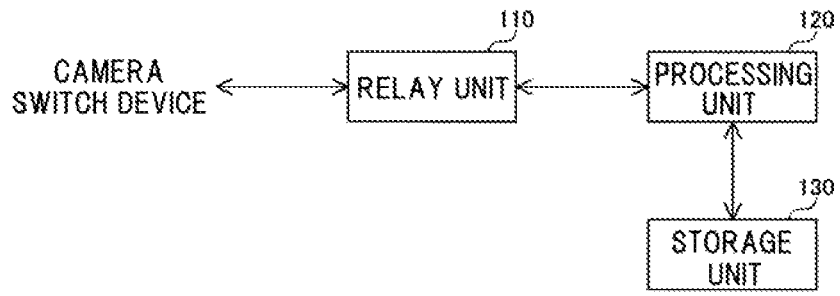
FIG. 5 illustrates the structure of each switch device according to the embodiment of the present disclosure.

FIG. 5 illustrates the structure of each switch device according to the embodiment of the present disclosure.

Referring to FIG. 5, each switch device 100 includes a relay unit 110, a processing unit 120, and a storage unit 130.

The relay unit 110 performs the relay process of relaying information that is exchanged on the vehicle-mounted network 21 by using the ethernet frame as described above.

The relay unit 110 receives the image information from the camera 201 and then outputs the received image information to the processing unit 120.

The processing unit 120 is capable of performing the intermediate processing on the image information from the camera 201.

More specifically, referring to FIG. 2 again, the switch device 101A is capable of performing the intermediate processing on the image information from the camera 201A. The switch device 101C is capable of performing the intermediate processing on the image information from the camera 201C. The switch device 101D is capable of performing the intermediate processing on the image information from the cameras 201C and 201D. The switch device 101B is capable of performing the intermediate processing on the image information from the cameras 201A, 201B, 201C, and 201D.

The relay unit 110 transmits at least the information that is generated by the intermediate processing of the processing unit 120 or the image information as the relay information to another device such as another switch device 101 or the autonomous driving ECU 301.

For example, the processing unit 120 analyzes the image information that is received from the relay unit 110 and performs the intermediate processing, based on the result of analysis.

More specifically, the processing unit 120 determines whether the object to be detected is in the imaged image that is represented by the image information by analyzing the image information by using, for example, a machine learning method.

If it is determined from the result of analysis of the image information that the object to be detected is not in the imaged image that is represented by the image information, the processing unit 120 performs the intermediate processing by discarding the image information that is received from the relay unit 110.

It is determined from the result of analysis of the image information that the object to be detected is in the imaged image that is represented by the image information, the processing unit 120 outputs the image information that is received from the relay unit 110 to the relay unit 110.

The relay unit 110 receives the image information from the processing unit 120 and then transmits the received image information as the relay information to another switch device 101 or the autonomous driving ECU 301.

The processing unit 120 performs the intermediate processing by analyzing the image information by using the machine learning method and processes the image information, based on the result of analysis. Alternatively, the processing unit 120 performs the intermediate processing by analyzing the image information by using the machine learning method and generates detection information, based on the result of analysis.

More specifically, the processing unit 120 performs the intermediate processing by analyzing the image information to detect the kind of the object to be detected such as a vehicle, a pedestrian, or a traffic light in the imaging region of each camera 201, the position of the object to be detected, the size, that is, the area of the object to be detected, the direction in which the object to be detected moves, the speed of the object to be detected in the directions of three axes, and the acceleration of the object to be detected in the directions of the three axes, and processes the image information, based on the result of detection, or generates the detection information that represents the result of detection.

For example, the processing unit 120 receives the image information from the relay unit 110, then generates image information with a changed size, based on the result of analysis of the received image information, and outputs the generated image information to the relay unit 110.

Figure 6:
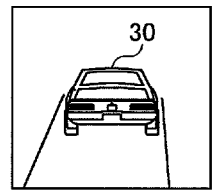
FIG. 6 illustrates an example of image information that is generated by a processing unit of each switch device according to the embodiment of the present disclosure.

FIG. 6 illustrates an example of the image information that is generated by the processing unit of each switch device according to the embodiment of the present disclosure. FIG. 6 illustrates image information that is generated based on the result of analysis of the image information that represents the imaged image in FIG. 3 by way of example.

The processing unit 120 receives the image information that represents the imaged image in FIG. 3 from the relay unit 110 and then detects the positions of the vehicles 30 and 40 each of which is the object to be detected by analyzing the image information.

Referring to FIG. 6, the processing unit 120 generates image information that represents a part of the imaged image in FIG. 3 such as an extracted image in which there is the vehicle 30, based on the result of detection and outputs the generated image information to the relay unit 110.

Figure 7:
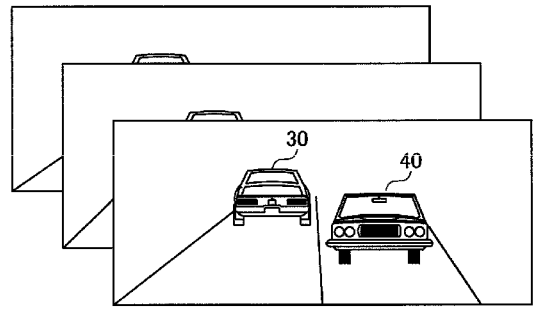
FIG. 7 illustrates another example of the image information that is generated by the processing unit of each switch device according to the embodiment of the present disclosure.

FIG. 7 illustrates another example of the image information that is generated by the processing unit of each switch device according to the embodiment of the present disclosure. FIG. 7 illustrates image information that is generated based on the result of analysis of the image information that represents the multiple imaged images in FIG. 4 by way of example.

Referring to FIG. 7, the processing unit 120 receives the image information that represents the multiple imaged images in FIG. 4 from the relay unit 110 and then detects, for example, the positions and speeds of the vehicles 30 and 40 each of which is the object to be detected by analyzing the image information.

If it is determined based on the result of detection that the risk of a collision between the vehicle 1 and the vehicle 30, for example, is low, the processing unit 120 removes a piece or pieces of the image information by discarding a part of the pieces of the image information and outputs the remaining image information to the relay unit 110.

Figure 8:
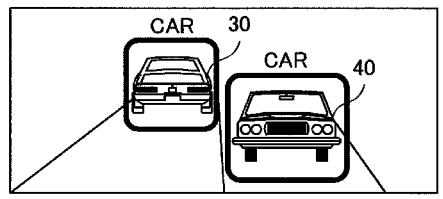
FIG. 8 illustrates another example of the image information that is generated by the processing unit of each switch device according to the embodiment of the present disclosure.

FIG. 8 illustrates another example of the image information that is generated by the processing unit of each switch device according to the embodiment of the present disclosure. FIG. 8 illustrates image information that is generated based on the result of analysis of the image information that represents the imaged image in FIG. 3 by way of example.

For example, the processing unit 120 generates image information by adding the result of analysis into the image information that is received from the relay unit 110.

Specifically, referring to FIG. 8, the processing unit 120 receives the image information that represents the imaged image in FIG. 3 from the relay unit 110 and then detects that the kind of the object to be detected in the imaged image is a "vehicle" by analyzing the image information.

The processing unit 120 generates image information by adding detection information that represents the kind of the object to be detected into the image information, based on the result of detection and outputs the generated image information to the relay unit 110.

Figure 9:
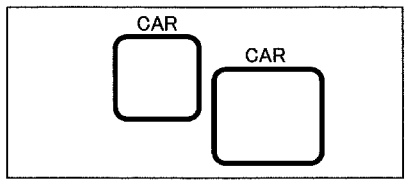
FIG. 9 illustrates an example of detection information that is generated by the processing unit of each switch device according to the embodiment of the present disclosure.

FIG. 9 illustrates an example of the detection information that is generated by the processing unit of each switch device according to the embodiment of the present disclosure. FIG. 9 illustrates detection information that is generated based on the result of analysis of the image information that represents the imaged image in FIG. 3 by way of example.

For example, the processing unit 120 outputs the result of analysis of the image information that is received from the relay unit 110 to the relay unit 110.

Specifically, referring to FIG. 9, the processing unit 120 receives the image information that represents the imaged image in FIG. 3 from the relay unit 110 and then detects that the kind of the object to be detected in the imaged image is a "vehicle" by analyzing the image information.

The processing unit 120 discards the imaged image, based on the result of detection, generates detection information that represents the kind and position of the object to be detected, and outputs the generated detection information to the relay unit 110.

The relay unit 110 transmits the image information that is received from the processing unit 120 or the detection information as the relay information to another switch device 101 or the autonomous driving ECU 301.

For example, the processing unit 120 is capable of changing the content of the intermediate processing as described above, based on the result of analysis of the image information that is received from the camera 201 via the relay unit 110. For example, the processing unit 120 is capable of changing whether the image information is discarded, based on the result of analysis of the image information.

The relay unit 110 receives the instruction information from the autonomous driving ECU 301 and then outputs the received instruction information to the processing unit 120.

For example, the processing unit 120 saves the instruction information that is received from the relay unit 110 in the storage unit 130. The processing unit 120 receives the image information from the relay unit 110 and then processes the image information, generates the detection information or discards the image information in accordance with the content of the intermediate processing that is represented by the instruction information that is saved in the storage unit 130.

[Autonomous Driving ECU]

Figure 10:
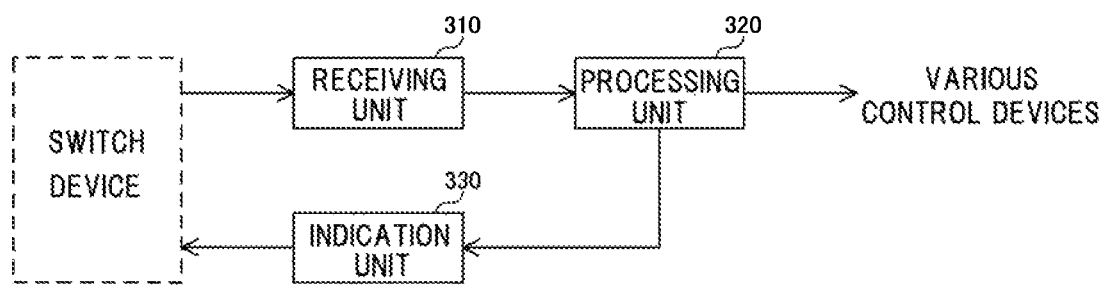
FIG. 10 illustrates the structure of an autonomous driving ECU according to the embodiment of the present disclosure.

FIG. 10 illustrates the structure of the autonomous driving ECU according to the embodiment of the present disclosure.

Referring to FIG. 10, the autonomous driving ECU 301 includes a receiving unit 310, a processing unit 320, and an indication unit 330.

The receiving unit 310 receives, from the switch devices 101, the relay information based on the image information from the cameras 201.

The receiving unit 310 outputs the relay information that is received from the switch devices 101 to the processing unit 320.

The processing unit 320 performs the target process by using the relay information that is received from the receiving unit 310. For example, the processing unit 320 performs the target process by detecting the situation of travelling of the vehicle 1 and by implementing the automatic driving control based on the result of detection.

More specifically, the processing unit 320 analyzes the relay information that is received from the receiving unit 310. The processing unit 320 detects the situation of travelling of the vehicle 1 by analyzing the relay information by using, for example, the machine learning method and implements the driving control of the vehicle 1, based on the detected situation of travelling.

Specifically, the processing unit 320 detects the situation of travelling of the vehicle 1, for example, the kind of the object to be detected such as a vehicle, a pedestrian, or a traffic light in the imaging region of each camera 201, the position of the object to be detected, the size, that is, the area of the object to be detected, the direction in which the object to be detected moves, the speed of the object to be detected in the directions of the three axes, and the acceleration of the object to be detected in the directions of the three axes by analyzing the relay information.

For example, the receiving unit 310 receives the measurement information from sensors other than the cameras 201 such as an acceleration sensor, a speed sensor, and a gyro-sensor and outputs the received measurement information to the processing unit 320.

The processing unit 320 detects the situation of travelling of the vehicle 1, for example, the direction in which the vehicle 1 moves and the speed thereof by analyzing the measurement information that is received from the receiving unit 310.

The processing unit 320 implements the automatic driving control for the vehicle 1, based on the result of detection. Specifically, the processing unit 320 controls various control devices by transmitting a control signal to the various control devices such as an engine control device, a brake control device, and an accelerator control device, based on the result of detection.

The processing unit 320 outputs the result of analysis, that is, the detection information that represents the result of detection to the indication unit 330.

The indication unit 330 transmits the instruction information that represents the instruction about the intermediate processing to the switch devices 101 that are capable of performing the intermediate processing.

More specifically, the indication unit 330 transmits instruction information that represents whether the intermediate processing of the switch devices 101 is needed or the content thereof to the switch devices 101.

For example, the indication unit 330 transmits instruction information that represents a discarding condition in which the image information is to be discarded as whether the intermediate processing is needed to the switch devices 101.

Specifically, the indication unit 330 transmits the instruction information that represents, as the discarding condition, the entire image information from the cameras 201 is to be transmitted as the relay information without being discarded, the image information from the cameras 201 is to be partly removed and transmitted, or the image information is to be discarded if the result of analysis of the image information from the cameras 201 is that the object to be detected such as another vehicle or a pedestrian is not detected to the switch devices 101.

For example, the indication unit 330 transmits the instruction information that represents, as the content of the intermediate processing, change in size of the image information, extraction of a part of the image information that represents the object to be detected, addition of the result of analysis into the image information, or replacement of the image information with the result of analysis to the switch devices 101.

For example, the indication unit 330 generates the instruction information, based on the result of analysis with the processing unit 320. More specifically, the indication unit 330 generates the instruction information, based on the detection information that is received from the processing unit 320.

In an example, the indication unit 330 receives, from the processing unit 320, the detection information that represents the object to be detected such as another vehicle or a pedestrian is not in the imaged image that is represented by the image information A from the camera 201A and then generates the instruction information that represents a transmitting condition in which the image information is to be transmitted if the object to be detected is detected, that is, the instruction information that represents the discarding condition in which the image information is to be discarded if the object to be detected is not detected. The indication unit 330 transmits the generated instruction information to the switch device 101A.

In another example, the indication unit 330 generates the instruction information that represents the result of analysis with the switch devices 101 is to be added into the image information from the cameras 201 as the content of the intermediate processing, for example, in order to decrease its own processing load and transmits the generated instruction information to the switch devices 101.

In another example, the indication unit 330 generates the instruction information that represents the image information from the cameras 201 is to be replaced with the result of analysis with the switch devices 101 as the content of the intermediate processing, for example, in order to decrease its own processing load and transmits the generated instruction information to the switch devices 101.

In another example, the indication unit 330 receives the detection information that represents the vehicle 1 moves backward from the processing unit 320 and then generates the instruction information that represents the image information is to be partly removed and transmitted, based on the received detection information and transmits the generated instruction information to the switch devices 101C and 101D that are respectively connected to the cameras 201C and 201D the target region of which is a region behind the vehicle 1.

[Flow of Operation]

Each of the devices of the vehicle-mounted communication system according to the embodiment of the present disclosure includes a computer that includes a memory. An arithmetic processing unit such as a CPU of the computer reads a program that includes a part or all of steps of a sequence and a flowchart below from the memory and runs the program. The programs of the multiple devices can be installed from the outside. The programs of the multiple devices are distributed with the programs stored in a recording medium.

Figure 11:
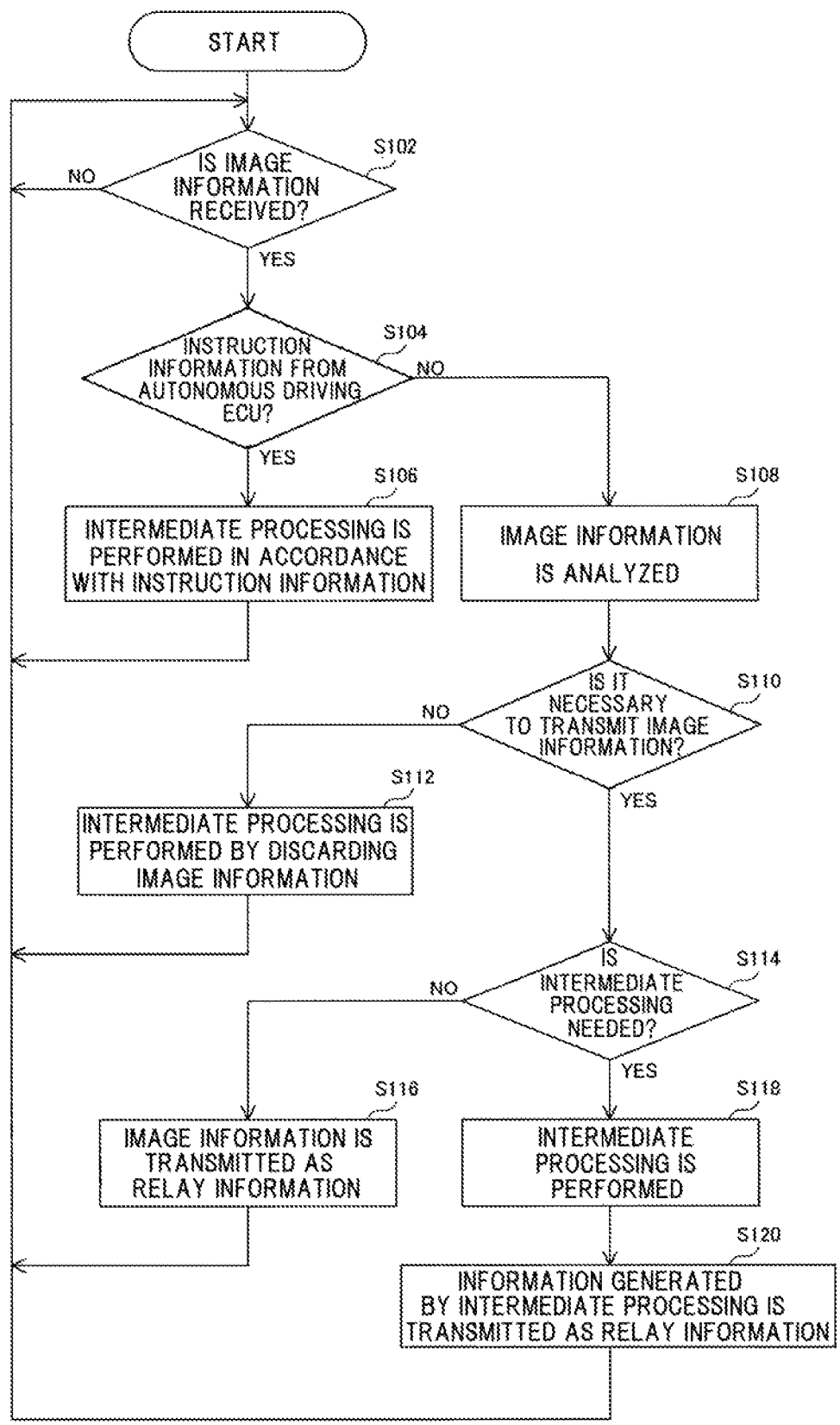
FIG. 11 is a flowchart in which operation procedures when the switch devices perform a relay process for the vehicle-mounted communication system according to the embodiment of the present disclosure are defined.

FIG. 11 is a flowchart in which operation procedures when the switch devices perform the relay process for the vehicle-mounted communication system according to the embodiment of the present disclosure are defined.

Referring to FIG. 11, the switch devices 101 first wait the image information from the cameras 201 (NO at a step S102), receive the image information (YES at the step S102), and then check whether the instruction information from the autonomous driving ECU 301 is held (a step S104).

Subsequently, if the instruction information from the autonomous driving ECU 301 is held (YES at the step S104), the switch devices 101 perform the intermediate processing in accordance with the held instruction information. Specifically, the switch devices 101 transmit information that is generated in accordance with the content of the intermediate processing that is represented by the instruction information as the relay information to another switch device 101 or the autonomous driving ECU 301. Alternatively, the switch devices 101 discard the image information without transmitting the image information in accordance with the content of the intermediate processing that is represented by the instruction information (a step S106).

Subsequently, the switch devices 101 wait new image information from the cameras 201 (NO at the step S102).

If the instruction information from the autonomous driving ECU 301 is not held (NO at the step S104), the switch devices 101 analyze the image information that is received from the cameras 201 (a step S108).

Subsequently, if it is determined from the result of analysis of the image information, for example, that the object to be detected is not in the imaged image that is represented by the image information, and it is not necessary to transmit the image information (NO at a step S110), the switch devices 101 perform the intermediate processing by discarding the image information that is received from the cameras 201 (at a step S112).

Subsequently, the switch devices 101 wait new image information from the cameras 201 (NO at the step S102).

If it is determined from the result of analysis of the image information that it is necessary to transmit the image information, and the intermediate processing is not needed (YES at the step S110 and NO at a step S114), the switch devices 101 transmit the image information that is received from the cameras 201 as the relay information to another switch device 101 or the autonomous driving ECU 301 (a step S116).

If it is determined from the result of analysis of the image information that it is necessary to transmit the image information, and the intermediate processing is needed (YES at the step S110 and YES at the step S114), the switch devices 101 perform the intermediate processing. For example, the switch devices 101 perform the intermediate processing by generating the image information in a manner in which the information that represents the kind of the object to be detected in the imaged image that is represented by the image information is added into the image information as illustrated in FIG. 8 (a step S118).

Subsequently, the switch devices 101 transmit the generated image information as the relay information to another switch device 101 or the autonomous driving ECU 301 (a step S120).

Subsequently, the switch devices 101 wait new image information from the cameras 201 (NO at the step S102).

Figure 12:
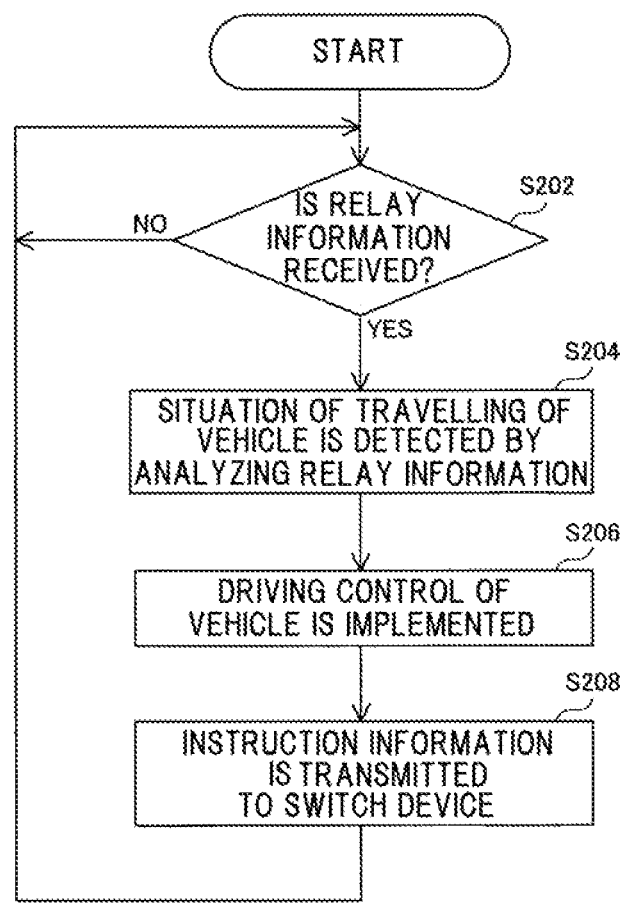
FIG. 12 is a flowchart in which operation procedures when the autonomous driving ECU according to the embodiment of the present disclosure performs a target process are defined.

FIG. 12 is a flowchart in which operation procedures when the autonomous driving ECU according to the embodiment of the present disclosure performs the target process are defined.

Referring to FIG. 12, the autonomous driving ECU 301 first waits the relay information from the switch devices 101 (NO at a step S202), receives the relay information (YES at the step S202), and performs the target process by detecting the situation of travelling of the vehicle 1 in a manner in which the received relay information is analyzed (a step S204).

Subsequently, the autonomous driving ECU 301 performs the target process by implementing the driving control of the vehicle 1, based on the detected situation of travelling (a step S206).

Subsequently, the autonomous driving ECU 301 generates the instruction information that represents the instruction about the intermediate processing of the switch devices 101, based on the result of analysis of the relay information and transmits the generated instruction information to the switch devices 101 (a step S208).

Subsequently, the autonomous driving ECU 301 waits new relay information from the switch devices 101 (NO at the step S202).

The order of the steps 5206 and 5208 described above is not limited to the above description but may be changed.

Figure 13:
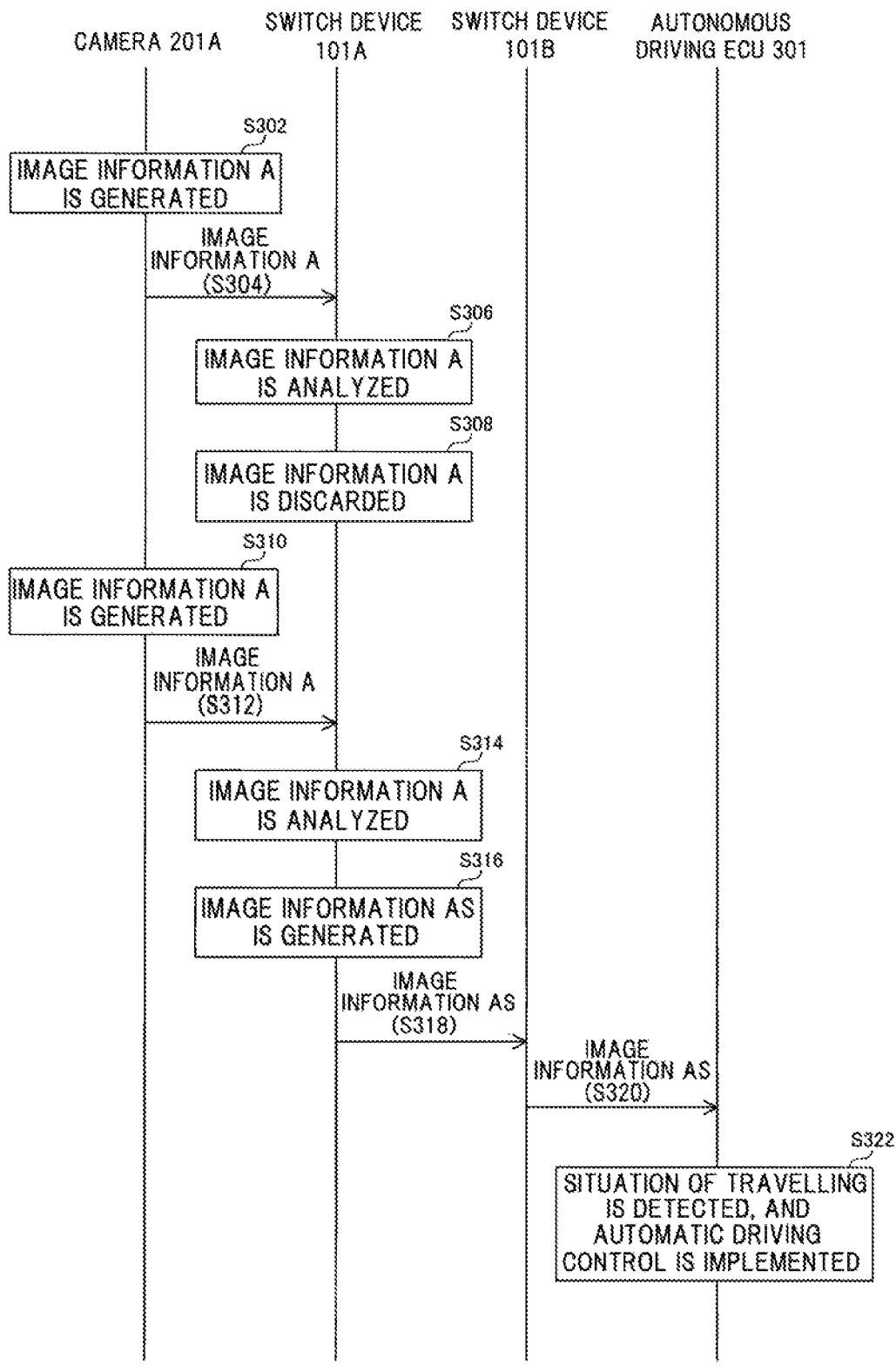
FIG. 13 illustrates an example of the sequence of a process of transmitting the image information for the vehicle-mounted communication system according to the embodiment of the present disclosure.

FIG. 13 illustrates an example of the sequence of a process of transmitting the image information for the vehicle-mounted communication system according to the embodiment of the present disclosure.

Referring to FIG. 13, the camera 201A first generates the image information A that represents the imaged image of the target region by photographing the target region around the vehicle 1 (a step S302).

Subsequently, the camera 201A transmits the generated image information A to the switch device 101A (a step S304).

Subsequently, the switch device 101A analyzes the image information A that is received from the camera 201A (a step S306).

Subsequently, if the result of analysis of the image information A is that the object to be detected is not in the imaged image, the switch device 101A performs the intermediate processing by discarding the image information A that is received from the camera 201A (a step S308).

Subsequently, the camera 201A generates new image information A that represents the imaged image of the target region by photographing the target region around the vehicle 1 with a next photograph timing (a step S310).

Subsequently, the camera 201A transmits the generated image information A to the switch device 101A (a step S312).

Subsequently, the switch device 101A analyzes the image information A that is received from the camera 201A (a step S314).

Subsequently, if the result of analysis of the image information A is that the object to be detected is in the imaged image, the switch device 101A performs the intermediate processing by generating image information AS in a manner in which the result of analysis of the image information A such as detection information that represents the kind of the object to be detected is a "vehicle" is added into the image information A (a step S316).

Subsequently, the switch device 101A transmits the generated image information AS as the relay information to the switch device 101B (a step S318).

Subsequently, the switch device 101B transmits the image information AS that is received from the switch device 101A as the relay information to the autonomous driving ECU 301 (a step S320).

Subsequently, the autonomous driving ECU 301 performs the target process by using the image information AS that is received from the switch device 101B, for example, in a manner in which the situation of travelling of the vehicle 1 is detected, and the automatic driving control based on the result of detection is implemented (a step S322).

Figure 14:
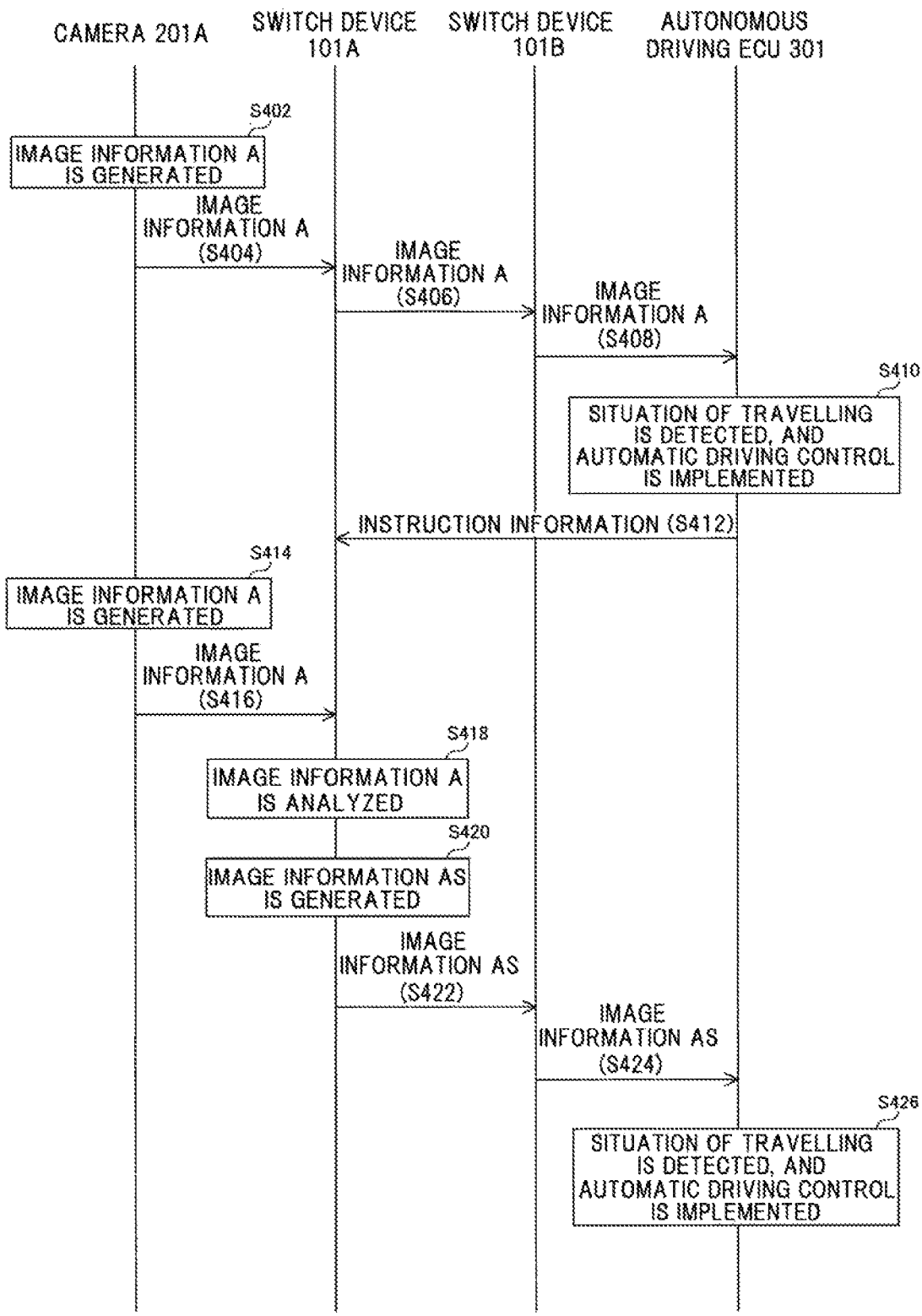
FIG. 14 illustrates another example of the sequence of the process of transmitting the image information for the vehicle-mounted communication system according to the embodiment of the present disclosure.

FIG. 14 illustrates another example of the sequence of the process of transmitting the image information for the vehicle-mounted communication system according to the embodiment of the present disclosure.

Referring to FIG. 14, the camera 201A first generates the image information A that represents the imaged image of the target region by photographing the target region around the vehicle 1 (a step S402).

Subsequently, the camera 201A transmits the generated image information A to the switch device 101A (a step S404).

Subsequently, the switch device 101A transmits the image information A that is received from the camera 201A as the relay information to the switch device 101B (a step S406).

Subsequently, the switch device 101B transmits the image information A that is received from the switch device 101A as the relay information to the autonomous driving ECU 301 (a step S408).

Subsequently, the autonomous driving ECU 301 performs the target process by using the image information A that is received from the switch device 101B, for example, in a manner in which the situation of travelling of the vehicle 1 is detected, and the automatic driving control based on the result of detection is implemented (a step S410).

Subsequently, the autonomous driving ECU 301 transmits the instruction information that represents image information that is acquired by adding the result of analysis with the switch device 101A into the image information from the camera 201A is to be transmitted to the switch device 101A, for example, in order to decrease its own processing load (a step S412).

Subsequently, the camera 201A generates new image information A that represents the imaged image of the target region by photographing the target region around the vehicle 1 with a next photograph timing (a step S414).

Subsequently, the camera 201A transmits the generated image information A to the switch device 101A (a step S416).

Subsequently, the switch device 101A analyzes the image information A that is received from the camera 201A in accordance with the instruction information that is received from the autonomous driving ECU 301 (a step S418).

Subsequently, if the result of analysis of the image information A is that the object to be detected is in the imaged image, the switch device 101A performs the intermediate processing by generating the image information AS in a manner in which the result of analysis of the image information A such as the detection information that represents the kind of the object to be detected is a "vehicle" is added into the image information A (a step S420).

Subsequently, the switch device 101A transmits the generated image information AS as the relay information to the switch device 101B (a step S422).

Subsequently, the switch device 101B transmits the image information AS that is received from the switch device 101A as the relay information to the autonomous driving ECU 301 (a step S424).

Subsequently, the autonomous driving ECU 301 performs the target process by using the image information AS that is received from the switch device 101B, for example, in a manner in which the situation of traveling of the vehicle 1 is detected, and the automatic driving control based on the result of detection is implemented (a step S426).

Figure 15:
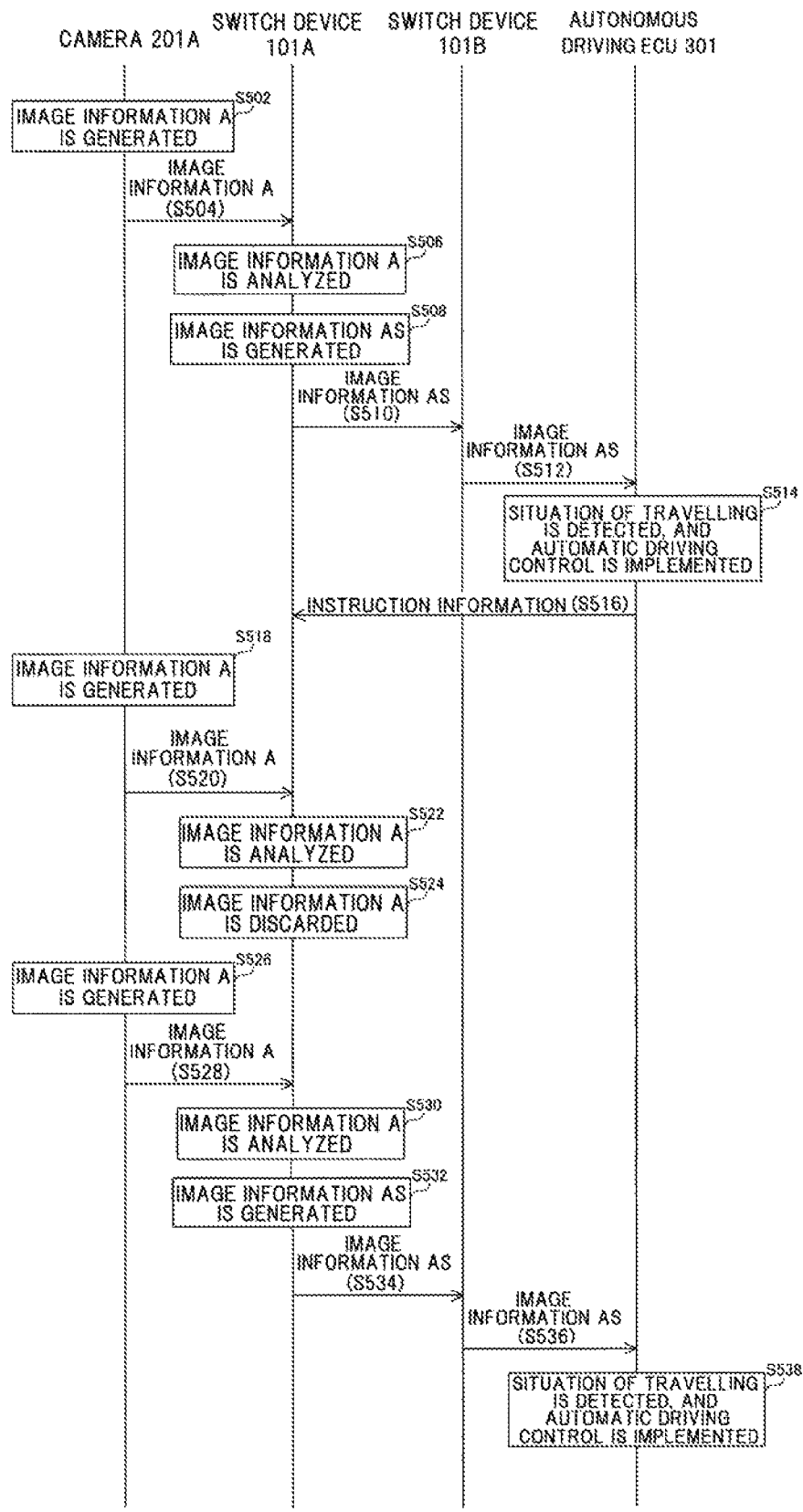
FIG. 15 illustrates another example of the sequence of the process of transmitting the image information for the vehicle-mounted communication system according to the embodiment of the present disclosure.

FIG. 15 illustrates another example of the sequence of the process of transmitting the image information for the vehicle-mounted communication system according to the embodiment of the present disclosure.

Referring to FIG. 15, the camera 201A first generates the image information A that represents the imaged image of the target region by photographing the target region around the vehicle 1 (a step S502).

Subsequently, the camera 201A transmits the generated image information A to the switch device 101A (a step S504).

Subsequently, the switch device 101A analyzes the image information A that is received from the camera 201A (a step S506).

Subsequently, if the result of analysis of the image information A is that the object to be detected is in the imaged image, the switch device 101A performs the intermediate processing by generating the image information AS in a manner in which the result of analysis of the image information A such as the detection information that represents the kind of the object to be detected is a "vehicle" is added into the image information A (a step S508).

Subsequently, the switch device 101A transmits the generated image information AS as the relay information to the switch device 101B (a step S510).

Subsequently, the switch device 101B transmits the image information AS that is received from the switch device 101A as the relay information to the autonomous driving ECU 301 (a step S512).

Subsequently, the autonomous driving ECU 301 performs the target process by using the image information AS that is received from the switch device 101B, for example, in a manner in which the situation of travelling of the vehicle 1 is detected, and the automatic driving control based on the result of detection is implemented (a step S514).

Subsequently, the autonomous driving ECU 301 transmits, to the switch device 101A, the instruction information that represents the image information is to be discarded if the object to be detected such as another vehicle or a pedestrian is not detected in the image information from the cameras 201 (a step S516).

Subsequently, the camera 201A generates new image information A that represents the imaged image of the target region by photographing the target region around the vehicle 1 with a next photograph timing (a step S518).

Subsequently, the camera 201A transmits the generated image information A to the switch device 101A (a step S520).

Subsequently, the switch device 101A analyzes the image information A that is received from the camera 201A (a step S522).

Subsequently, if the result of analysis of the image information A is that the object to be detected is not in the imaged image, the switch device 101A performs the intermediate processing by discarding the image information A that is received from the camera 201A in accordance with the instruction information that is received from the autonomous driving ECU 301 (a step S524).

Subsequently, the camera 201A generates new image information A that represents the imaged image of the target region by photographing the target region around the vehicle 1 with a next photograph timing (a step S526).

Subsequently, the camera 201A transmits the generated image information A to the switch device 101A (a step S528).

Subsequently, the switch device 101A analyzes the image information A that is received from the camera 201A (a step S530).

Subsequently, if the result of analysis of the image information A is that the object to be detected is in the imaged image, the switch device 101A performs the intermediate processing by generating the image information AS in a manner in which the result of analysis of the image information A such as the detection information that represents the kind of the object to be detected is a "vehicle" is added into the image information A (a step S532).

Subsequently, the switch device 101A transmits the generated image information

AS as the relay information to the switch device 101B (a step S534).

Subsequently, the switch device 101B transmits the image information AS that is received from the switch device 101A as the relay information to the autonomous driving ECU 301 (a step S536).

Subsequently, the autonomous driving ECU 301 performs the target process by using the image information AS that is received from the switch device 101B, for example, in a manner in which the situation of travelling of the vehicle 1 is detected, and the automatic driving control based on the result of detection is implemented (a step S538).

As for the vehicle-mounted communication system 401 according to the embodiment of the present disclosure, the switch devices 101 perform the intermediate processing in accordance with the instruction information that is received from the autonomous driving ECU 301 and perform the intermediate processing, based on the result of analysis of the image information that is received from the cameras 201 but is not limited thereto.

The switch devices 101 perform the intermediate processing in accordance with the instruction information that is received from the autonomous driving ECU 301 but may not perform the intermediate processing based on the result of analysis of the image information that is received from the cameras 201. The switch devices 101 perform the intermediate processing, based on the result of analysis of the image information that is received from the cameras 201, but the autonomous driving ECU 301 may not transmit the instruction information to the switch devices 101.

As for the vehicle-mounted communication system 401 according to the embodiment of the present disclosure, the switch devices 101 perform the intermediate processing on the measurement information from the cameras 201 but is not limited thereto. The switch devices 101 may perform the intermediate processing on the measurement information from sensors other than the cameras 201 such as an acceleration sensor, a speed sensor, and a gyro-sensor.

As for the vehicle-mounted communication system 401 according to the embodiment of the present disclosure, the switch device 101B of the four switch devices 101 is connected to the autonomous driving ECU 301 that is an example of the functional unit, and the switch device 101B transmits the relay information that is transmitted from the other switch devices 101A, 101C, and 101D to the autonomous driving ECU 301 but is not limited thereto.

One of the switch devices 101 other than the switch device 101B such as the switch device 101D may be connected to another functional unit. In this case, the switch device 101D transmits the relay information that is transmitted from the switch devices 101A, 101B, and 101C to the other functional unit.

As for the vehicle-mounted communication system 401 according to the embodiment of the present disclosure, the switch devices 101 are capable of at least changing the content of the intermediate processing or changing whether the relay information is transmitted but is not limited thereto. The switch devices 101 may not have a function of changing the content of the intermediate processing and changing whether the relay information is transmitted.

As for the vehicle-mounted communication system 401 according to the embodiment of the present disclosure, the switch devices 101 are capable of changing the content of the intermediate processing by switching between the mode in which new information is generated from the image information and the mode in which new information is not generated but is not limited thereto. The switch devices 101 may be capable of changing the content of the intermediate processing by changing the content of the new information to be generated.

Specifically, the switch devices 101 are capable of changing the kind of the object to be detected, the position of the object to be detected, the size of the object to be detected, and the direction in which the object to be detected moves as the content of the new information that is generated from the image information.

By the way, there is a need for a technique that enables the processing load of the vehicle-mounted network to be decreased.

For example, as the kind and amount of data that is exchanged on the vehicle-mounted network increase, the processing load of the functional unit that performs the predetermined target process by using the data increases. In view of this, there is a need for a technique that enables the processing load of the functional unit to be decreased.

The vehicle-mounted communication system 401 according to the embodiment of the present disclosure includes the multiple switch devices 101 that are mounted on the vehicle 1. At least one of the multiple switch devices 101 is capable of performing the intermediate processing that is intermediate information processing on the image information from the cameras 201 that are mounted on the vehicle 1. At least one of the multiple switch devices 101 transmits at least the information that is generated by the intermediate processing or the image information as the relay information to another switch device 101. The other switch device 101 transmits the transmitted relay information to the autonomous driving ECU 301 that is to perform the target process by using the relay information.

The switch devices 101 thus transmit at least the information that is generated by the intermediate processing on the image information or the image information as the relay information to the other switch device 101. This enables the switch devices 101 to perform, for example, a part of the target process to be performed by the autonomous driving ECU 301 and enables the processing load of the autonomous driving ECU 301 to be shared with the switch devices 101. This inhibits the processing load of the autonomous driving ECU 301 from concentrating and reduces, for example, heat generation due to the processing load.

Accordingly, the vehicle-mounted communication system 401 according to the embodiment of the present disclosure enables the processing load of the vehicle-mounted network to be decreased. The vehicle-mounted communication system 401 decreases the processing load of the vehicle-mounted network along with processing on the relay information and consequently enables the transmission delay and loss of another information on the vehicle-mounted network, for example, to be decreased.

As for the vehicle-mounted communication system 401 according to the embodiment of the present disclosure, the switch devices 101 analyze the received image information and perform the intermediate processing, based on the result of analysis.

With this structure, the switch devices 101 are capable of transmitting useful information that can be used in the target process of the autonomous driving ECU 301 as the relay information to the autonomous driving ECU 301 in accordance with the content of the image information.

As for the vehicle-mounted communication system 401 according to the embodiment of the present disclosure, the switch devices 101 perform the intermediate processing in accordance with the instruction information from the autonomous driving ECU 301.

With this structure, information that is needed by the autonomous driving ECU 301 can be transmitted as the relay information to the autonomous driving ECU 301, based on the instruction information from the autonomous driving ECU 301.

As for the vehicle-mounted communication system 401 according to the embodiment of the present disclosure, the switch devices 101 are capable of at least changing the content of the intermediate processing or changing whether the relay information is transmitted.

With this structure, the content of the information processing of the switch devices 101 can be changed, for example, depending on the situation of travelling of the vehicle 1 or the situation of the processing load of the autonomous driving ECU 301.

As for the vehicle-mounted communication system 401 according to the embodiment of the present disclosure, the switch devices 101 are capable of changing the content of the intermediate processing by switching between the mode in which new information is generated from the image information and the mode in which new information is not generated.

With this structure, for example, the intermediate processing enables new useful information that can be used in the target process of the autonomous driving ECU 301 to be generated and transmitted to the autonomous driving ECU 301.

As for the vehicle-mounted communication system 401 according to the embodiment of the present disclosure, the switch devices 101 perform the intermediate processing by analyzing the received image information and transmit the relay information that is acquired by adding the result of analysis into the image information to another switch device 101.

With this structure, the relay information that includes the result of analysis can be transmitted to the autonomous driving ECU 301, and a part or the whole of analysis processing that is to be performed by the autonomous driving ECU 301 can be delegated to the switch devices 101.

As for the vehicle-mounted communication system 401 according to the embodiment of the present disclosure, the switch devices 101 perform the intermediate processing by analyzing the received image information and transmit the result of analysis as the relay information to another switch device 101.

With this structure, the result of analysis can be transmitted as the relay information to the autonomous driving ECU 301, the amount of the data of the relay information that is transmitted to the autonomous driving ECU 301 is decreased, and a part or the whole of the analysis processing that is to be performed by the autonomous driving ECU 301 can be delegated to the switch devices 101.

The switch devices 101 according to the embodiment of the present disclosure are mounted on the vehicle 1. The processing units 120 are capable of performing the intermediate processing that is the intermediate information processing on the image information from the cameras 201 that are mounted on the vehicle 1. The relay units 110 transmit at least the information that is generated by the intermediate processing or the image information as the relay information to another device.

At least the information that is generated by the intermediate processing on the image information or the image information is thus transmitted as the relay information to the other device. Consequently, as for the vehicle-mounted network 21 that includes the switch devices 101 and the autonomous driving ECU 301 that is to perform the target process by using the relay process, the switch devices 101 are capable of performing, for example, a part of the target process that is to be performed by the autonomous driving ECU 301, and consequently, the processing load of the autonomous driving ECU 301 can be shared with the switch devices 101. This inhibits the processing load of the autonomous driving ECU 301 from concentrating and reduces, for example, heat generation due to the processing load.

Accordingly, the switch devices 101 according to the embodiment of the present disclosure enable the processing load of the vehicle-mounted network to be decreased. The switch devices 101 decrease the processing load of the vehicle-mounted network along with processing on the relay information and consequently enable the transmission delay and loss of communication of another information on the vehicle-mounted network, for example, to be decreased.

The autonomous driving ECU 301 according to the embodiment of the present disclosure is mounted on the vehicle 1 on which the multiple switch devices 101 are mounted. The receiving unit 310 receives, from the switch devices 101, the relay information based on the image information from the cameras 201 that are mounted on the vehicle 1. The processing unit 320 performs the target process by using the relay information that is received by the receiving unit 310. The indication unit 330 transmits the instruction information that represents the instruction about the intermediate processing to the switch devices 101 that are capable of performing the intermediate processing that is the intermediate information processing on the image information.

The instruction information that represents the instruction about the intermediate processing is thus transmitted to the switch devices 101 that are capable of performing the intermediate processing on the image information. Consequently, a part of the target process to be performed by itself, for example, can be performed as the intermediate processing by the switch devices 101, and consequently, its own processing load can be shared with the switch devices 101. This inhibits the processing load from concentrating and reduces, for example, heat generation due to the processing load.

Accordingly, the autonomous driving ECU 301 according to the embodiment of the present disclosure enables the processing load of the vehicle-mounted network to be decreased. The autonomous driving ECU 301 decreases the processing load of the vehicle-mounted network along with processing on the relay information and consequently enables the transmission delay and loss of communication of another information on the vehicle-mounted network, for example, to be decreased.

The processing unit 320 of the autonomous driving ECU 301 according to the embodiment of the present disclosure analyzes the relay information in the target process. The indication unit 330 generates the instruction information, based on the result of analysis with the processing unit 320.

With this structure, the content of the relay information that is transmitted by the switch devices 101 can be instructed to the switch devices 101 depending on, for example, the situation of travelling of the vehicle 1 that is detected by analyzing the relay information.

A communication control method according to the embodiment of the present disclosure is a communication control method for the vehicle-mounted communication system 400 that includes the multiple switch devices 101 that are mounted on the vehicle 1. In the communication control method, at least one of the multiple switch devices 101 first performs the intermediate processing that is the intermediate information processing on the measurement information from the cameras 201 that are mounted on the vehicle 1. Subsequently, at least one of the multiple switch devices 101 transmits at least the information that is generated by the intermediate processing or the measurement information as the relay information to another switch device 101. Subsequently, the other switch device 101 transmits the transmitted relay information to the autonomous driving ECU 301 that is to perform the target process by using the relay information.

A part of the target process to be performed by the autonomous driving ECU 301, for example, can be performed by the switch devices 101, and consequently, the processing load of the autonomous driving ECU 301 can be shared with the switch devices 101 in a manner in which the switch devices 101 thus transmit at least the information that is generated by the intermediate processing on the image information or the image information as the relay information to the other switch device 101. This inhibits the processing load of the autonomous driving ECU 301 from concentrating and reduces, for example, heat generation due to the processing load.

Accordingly, the communication control method according to the embodiment of the present disclosure enables the processing load of the vehicle-mounted network to be decreased. As a result of the decrease in the processing load of the vehicle-mounted network along with processing on the relay information, the vehicle-mounted communication system 401 enables the transmission delay and loss of another information on the vehicle-mounted network, for example, to be decreased.

A communication control method according to the embodiment of the present disclosure is a communication control method for the switch devices 101 that are mounted on the vehicle 1. In the communication control method, the switch devices 101 first perform the intermediate processing that is the intermediate information processing on the measurement information from the cameras 201 that are mounted on the vehicle 1. Subsequently, the switch devices 101 transmit at least the information that is generated by the intermediate processing or the measurement information as the relay information to another device.

As for the vehicle-mounted network 21 that includes the switch devices 101 and the autonomous driving ECU 301 that is to perform the target process by using the relay process, the switch devices 101 are capable of performing, for example, a part of the target process that is to be performed by the autonomous driving ECU 301, and consequently, the processing load of the autonomous driving ECU 301 can be shared with the switch devices 101 in a manner in which at least the information that is generated by the intermediate processing on the image information or the image information is transmitted as the relay information to the other device. This inhibits the processing load of the autonomous driving ECU 301 from concentrating and reduces, for example, heat generation due to the processing load.

Accordingly, the communication control method according to the embodiment of the present disclosure enables the processing load of the vehicle-mounted network to be decreased. As a result of the decrease in the processing load of the vehicle-mounted network along with processing on the relay information, the switch devices 101 enable the transmission delay and loss of communication of another information on the vehicle-mounted network, for example, to be decreased.

A communication control method according to the embodiment of the present disclosure is a communication control method for the autonomous driving ECU 301 that is mounted on the vehicle 1. In the communication control method, the autonomous driving ECU 301 first receives the relay information from the switch devices 101 that are mounted on the vehicle 1. Subsequently, the autonomous driving ECU 301 performs the target process by using the received relay information. Subsequently, the autonomous driving ECU 301 transmits the instruction information that represents the instruction about the intermediate processing to the switch devices 101 that are capable of performing the intermediate processing that is the intermediate information processing on the measurement information from the cameras 201 that are mounted on the vehicle 1.

A part of the target process to be performed by itself, for example, can be performed as the intermediate processing by the switch devices 101, and consequently, its own processing load can be shared with the switch devices 101 in a manner in which the instruction information that represents the instruction about the intermediate processing is transmitted to the switch devices 101 that are capable of performing the intermediate processing on the image information. This inhibits the processing load from concentrating and reduces, for example, heat generation due to the processing load.

Accordingly, the communication control method according to the embodiment of the present disclosure enables the processing load of the vehicle-mounted network to be decreased. As a result of the decrease in the processing load of the vehicle-mounted network along with processing on the relay information, the autonomous driving ECU 301 enables the transmission delay and loss of communication of another information on the vehicle-mounted network, for example, to be decreased.

It should be thought that the embodiment is described above by way of example in all aspects and is not restrictive. The scope of the present invention is not shown by the above description but is shown by the scope of claims and includes all modifications having the equivalent meaning and scope to those of the claims.

The above description contains features described below.
[Additional Remark 1]

A vehicle-mounted communication system includes multiple switch devices that are mounted on a vehicle. A first switch device that is one of the multiple switch devices is capable of performing intermediate processing that is intermediate information processing on measurement information from a sensor that is mounted on the vehicle by processing or discarding the measurement information. The first switch device transmits at least information that is generated by the intermediate processing or the measurement information as relay information to a second switch device that is one of the multiple switch devices. The second switch device transmits the relay information that is transmitted to a functional unit that is to perform a target process by using the relay information. The first switch device processes or discards the measurement information, based on a result of analysis of the measurement information that is received from the sensor or in accordance with instruction information that is received from the functional unit.
[Additional Remark 2]

A switch device that is mounted on a vehicle includes a processing unit that is capable of performing intermediate processing that is intermediate information processing on measurement information from a sensor that is mounted on the vehicle by processing or discarding the measurement information, and a relay unit that transmits at least information that is generated by the intermediate processing or the measurement information as relay information to another device. The processing unit processes or discards the measurement information, based on a result of analysis of the measurement information that is received from the sensor.
[Additional Remark 3]

A functional unit that is mounted on a vehicle on which multiple switch devices are mounted includes a receiving unit that receives, from the multiple switch devices, relay information based on measurement information from a sensor that is mounted on the vehicle, a processing unit that performs a target process by using the relay information that is received by the receiving unit, and an indication unit that transmits instruction information that represents an instruction about intermediate processing to the multiple switch devices that are capable of performing the intermediate processing that is intermediate information processing on the measurement information. The indication unit generates the instruction information that represents an instruction about processing or discarding the measurement information as the instruction about the intermediate processing, based on a result of analysis with the processing unit.

REFERENCE SIGNS LIST

1 vehicle
10 ethernet cable
20, 21 vehicle-mounted network
30, 40 another vehicle
100, 101 switch device
110 relay unit
120 processing unit
130 storage unit
200 sensor
201 camera
300 functional unit
301 autonomous driving ECU
310 receiving unit
320 processing unit
330 indication unit
400 vehicle-mounted communication system

The invention claimed is:

1. A system comprising:
a vehicle-mounted network comprising:
   a sensor,
   a functional circuit, and
   a vehicle mounted communication system comprising:
      multiple switch devices that are mounted on a vehicle and which form a communication network,
wherein the vehicle mounted communication system is communicatively coupled to the sensor and the functional circuit,
wherein at least one of the multiple switch devices is configured to perform intermediate processing for partly removing measurement information from the sensor that is mounted on the vehicle,
wherein the at least one of the multiple switch devices is configured to transmit at least information that is generated by the intermediate processing or the measurement information as relay information to another switch device,
wherein the other switch device is configured to transmit the relay information that is transmitted to the functional circuit mounted on the vehicle that is configured to perform a target process by using the relay information, and
wherein the at least one of the multiple switch devices is configured to perform the intermediate processing for partly removing the measurement in accordance with instruction information generated and transmitted by the functional circuit, and
wherein the at least one of the multiple switch devices is configured to execute partly removing the measurement information based on at least one of a risk level of a collision of the vehicle or a direction in which the vehicle is moving, so as to reduce a processing load of the functional circuit.

2. The vehicle mounted communication-system according to claim 1, wherein the at least one of the multiple switch devices is configured to analyze the measurement information that is received and perform the intermediate processing, based on a result of analysis.

3. The system according to claim 1, wherein the at least one of the multiple switch devices is configured to change whether the relay information is transmitted.

4. The system according to claim 3, wherein the at least one of the multiple switch devices is configured to change the content of the intermediate processing by switching between a mode in which new information is generated from the measurement information and a mode in which new information is not generated.

5. The system according to claim 1, wherein the at least one of the multiple switch devices is configured to perform the intermediate processing by analyzing the measurement information that is received and transmit the relay information that is acquired by adding a result of analysis into the measurement information to the other switch device.

6. The system according to claim 1, wherein the at least one of the multiple switch devices is configured to perform the intermediate processing by analyzing the measurement information that is received and transmit a result of analysis as the relay information to the other switch device.

7. The system according to claim 2, wherein the at least one of the multiple switch devices is configured to change whether the relay information is transmitted.

8. The vehicle according to claim 2, wherein the at least one of the multiple switch devices is configured to perform the intermediate processing by analyzing the measurement information that is received and transmit the relay information that is acquired by adding a result of analysis into the measurement information to the other switch device.

9. The vehicle according to claim 2, wherein the at least one of the multiple switch devices is configured to perform the intermediate processing by analyzing the measurement information that is received and transmit a result of analysis as the relay information to the other switch device.

10. The system according to claim 3, wherein the at least one of the multiple switch devices is configured to perform the intermediate processing by analyzing the measurement information that is received and transmit the relay information that is acquired by adding a result of analysis into the measurement information to the other switch device.

11. The system according to claim 1, wherein the at least one of the multiple switch devices is capable of changing whether the relay information, based on the processing load of the functional circuit, is transmitted.

12. The vehicle according to claim 1, wherein the at least one of the multiple switch devices analyzes the measurement information by determining whether an object to be detected by the sensor is included in the measurement information that is received and performs the intermediate processing, based on a result of the analysis.

13. The system according to claim 3, wherein the relay information is based on a situation of the processing load of the functional circuit.

14. The system according to claim 1, wherein the at least one of the multiple switch devices is configured to perform at least a part of the target process to be performed by the functional circuit, so as to reduce the processing load of the functional circuit.

15. The system according to claim 1, wherein the at least one of the multiple switch devices is configured to execute partly removing the measurement information based both a risk level of a collision of the vehicle and a direction in which the vehicle is moving, so as to reduce a processing load of the functional circuit.

* * * * *